(12) United States Patent
Cofler

(10) Patent No.: US 6,854,049 B2
(45) Date of Patent: Feb. 8, 2005

(54) METHOD OF HANDLING INSTRUCTIONS WITHIN A PROCESSOR WITH DECOUPLED ARCHITECTURE, IN PARTICULAR A PROCESSOR FOR DIGITAL SIGNAL PROCESSING, AND CORRESPONDING PROCESSOR

(75) Inventor: Andrew Cofler, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 432 days.

(21) Appl. No.: 10/083,629

(22) Filed: Feb. 26, 2002

(65) Prior Publication Data

US 2002/0147901 A1 Oct. 10, 2002

(30) Foreign Application Priority Data

Feb. 27, 2001 (FR) .......................................... 01 02647

(51) Int. Cl.⁷ .............................................. G06F 13/00
(52) U.S. Cl. ........................................ 712/225; 712/215
(58) Field of Search ................................ 712/225, 215

(56) References Cited

U.S. PATENT DOCUMENTS

| 5,664,137 | A  |   | 9/1997  | Abramson et al. | ........ | 395/392 |
| 5,854,914 | A  | * | 12/1998 | Bodas et al.    | ........ | 712/216 |
| 6,434,693 | B1 | * | 8/2002  | Senter et al.   | ........ | 712/245 |
| 6,463,514 | B1 | * | 10/2002 | Ray et al.      | ........ | 711/168 |
| 6,560,674 | B1 | * | 5/2003  | Hosogi et al.   | ........ | 711/118 |
| 6,704,817 | B1 | * | 3/2004  | Steinman et al. | ........ | 710/100 |
| 6,769,049 | B1 | * | 7/2004  | Bernard et al.  | ........ | 711/154 |

FOREIGN PATENT DOCUMENTS

| EP | 0133477 | 2/1985  | ............ G06F/9/38 |
| EP | 0840209 | 5/1998  | ............ G06F/9/38 |
| EP | 1050805 | 11/2000 | ............ G06F/9/38 |

OTHER PUBLICATIONS

Fossum et al., "Designing a Vax for High Performance" Computer Society International Conference, Spring Meeting, Los Alamitor, Feb. 26–Mar. 2, 1990, Los Alamitor, IEEE Comp. Soc. Press, US, vol. Conf. 35, Feb. 26, 1990, pp. 36–43, XP000146163.

Yoshida et al., "A Strategy for Avoiding Pipeline Interlock Delays in a Microprocessor" Proceedings of the International Conference on Computer Design: VLSI in Computers and Processors, Cambridge, MA., Sep. 17–19, 1990, pp. 14–19, XP000201400.

Zhang et al., "Performance Modeling and Code Partitioning for the DS Architecture" Computer Architecture News, Association for Computing Machinery, New York, US, vol. 26, No. 3, Specissue, Jun. 1, 1998, pp. 293–304, XP000784225.

* cited by examiner

*Primary Examiner*—Eric Coleman
(74) *Attorney, Agent, or Firm*—Lisa K. Jorgenson; Allen, Dyer, Doppelt, Milbrath & Gilchrist, P.A.

(57) ABSTRACT

A processing unit is associated with a first FIFO-type memory and with a second FIFO-type memory. Each instruction for loading memory stored data into a register within the processing unit is stored in the first FIFO-type memory, and other operative instructions are stored in the second FIFO-type memory. An operative instruction involving the register is removed from the second FIFO-type memory if no loading instruction which is earlier in time, and intended to modify a value of the register associated with this operative instruction is present in the first FIFO-type memory. In the presence of such an earlier loading instruction, the operative instruction is removed from the second FIFO-type memory only after the loading instruction has been removed from the first FIFO-type memory.

37 Claims, 14 Drawing Sheets

METHOD OF HANDLING INSTRUCTIONS WITHIN A PROCESSOR WITH DECOUPLED ARCHITECTURE, IN PARTICULAR A PROCESSOR FOR DIGITAL SIGNAL PROCESSING, AND CORRESPONDING PROCESSOR

FIELD OF THE INVENTION

The invention relates to processors, and more particularly, to a processor for digital signal processing (DSP).

BACKGROUND OF THE INVENTION

A processor generally includes several processing units operating in parallel. As processing units, an arithmetic and logic unit, an addressing unit and a branch-handling unit are conventionally used. In addition to these processing units, the processor generally includes a control unit or central unit which communicates with the program memory and issues individual instructions, which are also widely called microinstructions, to the various processing units.

Furthermore, the processor may have a decoupled architecture for allowing a higher speed of execution of the instructions after an initial latency time. The principle of a decoupled architecture is already known to those skilled in the art. Reference is directed to European Patent Application Nos. 949,565 and 1,050,799, for example. The principle of a decoupled architecture will now be reiterated briefly, and those skilled in the art can refer to the abovementioned European patent applications for further details, if necessary.

In addition to the abovementioned processing units, a memory interface is provided which contains a memory of the FIFO-type (first in/first out) intended to receive and to store, temporarily, the data contained in a data memory. A FIFO-type memory may be formed, for example, from two banks of an SRAM memory.

In a decoupled architecture, an instruction for loading memory stored data into a register is partitioned into two micro-instructions or instructions. A first instruction is transmitted to the addressing module (addressing unit) which calculates the actual address of the data in the data memory. The other instruction, which is an instruction for loading into the register in question, is temporarily stored in a FIFO memory associated with the arithmetic and logic unit. This second instruction remains on hold until the memory stored data, derived by the addressing unit, is available. When it is, the register concerned is then actually updated.

After an initial latency time, the addressing unit has drawn ahead of the arithmetic and logic unit. The machine is then decoupled. As seen from the arithmetic and logic unit, the imaginary latency is zero. However, since the instructions intended for the arithmetic and logic unit are processed in a time dependent order, as they are stored in a FIFO, it is entirely possible for a first instruction for loading data stored in a first register to be, at a given instant, stored at the head of the FIFO, and consequently ready to be delivered to the pipeline stages of the processing unit. It is also possible for a second instruction involving different registers of the first register to be stored just behind this first loading instruction. As long as this first loading instruction remains blocked at the head of the FIFO awaiting the memory stored data derived by the addressing unit, the second instruction, immediately behind it, also remains blocked since it is completely independent of the blocked instruction at the head of the FIFO.

SUMMARY OF THE INVENTION

In view of the foregoing background, an object of the present invention is to provide a mechanism for handling instructions which is totally different from that existing up to the present, and which can enhance the general performance of a processor with a decoupled architecture.

This and other objects, advantages and features of the present invention are provided by a method of handling instructions within a processor with a decoupled architecture, wherein the processor includes a core containing several processing units associated respectively with memories of the FIFO-type (first in/first out) for sequentially storing the respective instructions which are intended for the corresponding units.

Moreover, the issuing within the processor of an instruction for loading memory stored data into a register causes the issuing to the memory of a first processing unit, for example, an arithmetic and logic unit, of an instruction for loading into the register, and the issuing to the memory of a second processing unit, for example, the addressing unit, of an instruction intended to derive the memory stored data. The loading instruction is executed only when the memory stored data has been issued by the second processing unit.

According to one general characteristic of the invention, the memory of the first processing unit includes a first FIFO-type memory, and a second FIFO-type memory separate from the first one. Each loading instruction is stored in the first memory, and at least some of the other operative instructions intended for the first unit are stored in the second memory. It will be seen below that, according to one particularly advantageous implementation, that it is preferable when guarded instructions are present, the meaning of which will be detailed below, to store instructions known as transmission instructions in a third memory.

An operative instruction involving at least one register and having reached the head of the second memory is extracted from the second memory if no loading instruction which is earlier in time and intended to alter the value of the register or registers associated with this operative instruction is present in the first memory. In the presence of such a load modifying instruction which is earlier in time, the operative instruction is extracted from the second memory only after the load modifying instruction has been extracted from the first memory.

In other words, according to the invention, an instruction for loading memory stored data into a register no longer exhibits a "blocking character" with regards to operative instructions which are earlier in time and which do not involve at least one register affected by this loading instruction.

According to one implementation of the method according to the invention, every time an instruction is stored in the second memory without provision being made simultaneously to store a loading instruction in the first memory, a non-operative instruction (a NOP instruction according to nomenclature well known to those skilled in the art) is stored in the first memory. Furthermore, every time an instruction is extracted from the first memory, regardless of what it may be, a first read counter is incremented. Every time an instruction is stored, regardless of what it may be, a first write counter is incremented in the first memory.

Every time a load instruction is stored in the first memory, the current value of the first write counter is stored in a memory. Determination of the still-present character of this loading instruction in the first memory takes account of the result of the comparison of the memory stored current value of the first write counter with the current value of the first read counter. In other words, it is determined whether a load instruction which has been written into the first memory is still present in this first memory, by using the comparison of the memory stored current value of the first write counter with the memory stored current value of the first read counter.

The first read counter and the first write counter advantageously have an identical binary size which is equal to the depth of the first memory. According to one implementation of the method, an overflow bit is then associated with each first counter, changing value every time the corresponding first counter comes back to its initial value. Every time a load instruction is stored in the first memory, the current value of the overflow bit of the first write counter is likewise stored in a memory. The determination of the still-present character of this load instruction in the first memory also takes into account the result of the comparison of the current value of the overflow bit of the first read counter with the memory stored value of the overflow bit of the first write counter. This makes it possible to take into account the fact that the read pointer and the write pointer of the first memory can be situated in two different circular windows.

As far as the operative instructions involving at least one register are concerned, according to one implementation of the method according to the invention, every time an operative instruction involving at least one register is stored in the second memory, a first label is associated with it containing the current value of the first write counter which was stored in memory when the last (that is, the youngest) load instruction modifying at least one of the registers involved with the operative instruction was stored in the first memory. The criteria for extraction of this operative instruction having reached the head of the second memory then takes into account the result of the comparison between the memory stored current value associated with this operative instruction (contained in the first label), and the current value of the first read counter.

In other words, the basic principle here is to compare the current value of the first read counter with the current value of the first write counter, which was stored in a memory when the last load instruction modifying at least one of the registers involved with the operative instruction was stored in the first memory. The basic principle includes authorizing the extraction of the operative instruction having reached the head of the memory when the current value of the first read counter is higher than the memory stored current value contained in the first label, which was attached to this operative instruction.

However, here again, it is appropriate to take account especially of the case where a load instruction is written while the first write counter is in a given circular window and while the first read counter is still positioned in the preceding circular window. Thus, to resolve such special cases, according to one implementation of the method according to the invention, every time an operative instruction is stored in the second memory, the current value of the overflow bit of the first write counter, which was stored in a memory when the last load instruction modifying at least one of the registers involved with the operative instruction was stored in the first memory, is associated with it and also its first label. The criteria for extraction of this operative instruction having reached the head of the second memory also takes into account the result of the comparison between this memory stored current value associated with this operative instruction and the current value of the overflow bit of the first read counter.

Among the instructions issued to the processing units are instructions called guarded instructions allowing higher performance writing of the program code. The use of guarded instructions in a processor is already known to those skilled in the art, for example, reference is directed to European Patent Application No. 1,050,803. The principle of guarded instructions is reiterated briefly here, however, reference is directed to the abovementioned European patent application for further details.

A guarded instruction is an instruction assigned an indication called a guard indication, which is a guard bit capable of taking the value 0 or 1. The guarded instruction will then be executed depending on the value of the guard bit, that is, on the guard indication. All the binary values of the guard indications, possibly numbering 16 for example, are contained in a register called a guard indications register. This centralized register is incorporated within a processing unit, for example, in the arithmetic and logic unit, and at every instant contains the current values of the guard bits or indications. The values of these guard indications can be modified by specific instructions called modifying instructions.

To read the value of a guard indication associated with a guarded instruction, the processing unit which receives this guarded instruction, and which does not have direct access to the guard indication register (for example, the branching unit), requires a transfer of the value of the guard indication from the processing unit which is holding the guard indication register. In other words, the issuing of a guarded instruction to a processing unit which does not hold the guard indication register causes the issuing to the processing unit which is the holder of the guard indication register of an instruction called a transmission instruction. This instruction is intended to transmit to the processing unit, which receives the guarded instruction, the value of the guard indication associated with this guarded instruction.

The guarded instruction is kept in the header stage (output stage) of the FIFO-type instruction memory associated with this processing unit, until the latter receives, from the processing unit which is holding the guard indications register, the guard indication value associated with this guarded instruction. It is only when the processing unit which holds the guard indication register has executed the transmission instruction that the corresponding value of the guard indication will be transmitted to the requesting processing unit, so that it can execute its guarded instruction.

However, if for one reason or another the transmission instruction is blocked in the instruction memory of the processing unit which holds the guard indication register, the requesting processing unit will consequently also be blocked until it receives the value of the corresponding guard indication. The invention also provides an approach to this problem.

A further purpose of the invention is to provide a mechanism for handling guarded instructions which is completely different from that existing up to the present, and which can enhance the general performance of a processor using a centralized guard indications register.

Furthermore, the loading instructions may themselves be guarded instructions. However, with regards to the presence of the first memory, which is intended to store the loading instructions, it is necessary to ensure that the value of a guard indication issued by the guard indication register and intended for a loading instruction is actually the correct value expected, with regards to the execution, in order, of all the instructions stored in the various FIFOs. The invention also provides an approach to this problem.

More precisely, according to one implementation of the invention, the memory of the first unit includes a third FIFO-type memory, separate from the first memory and from the second memory, as well as a fourth FIFO-type memory, separate from the first three. The first unit furthermore contains a guard indication register.

The issuing of a guarded instruction to the memory of another processing unit different from the first one, for example, the branching unit, or the issuing of a guarded loading instruction to the first unit, causes the issuing to the first processing unit, and storage in the third memory, of a transmission instruction intended to cause transmission to the other unit (for example, the branching unit) or to the fourth memory, respectively, of the value of the guard indication associated with the guarded instruction or with the guarded loading instruction, respectively.

A transmission instruction having reached the head of this third memory is then extracted from the third memory if no modifying instruction earlier in time and intended to modify the value of the guard indication associated with this transmission instruction is present in the second memory. In the presence of such an earlier modifying instruction in the second memory, the transmission instruction is extracted from the third memory only after the modifying instruction has been extracted from the second memory. In other words, a transmission instruction can short-circuit or bypass all the other instructions if no earlier instructions stored in the second memory is of such a nature as to modify the value of the guard indication associated with this transmission instruction.

Furthermore, according to the invention, the fourth memory, which is intended to receive the values of the guard indications of the guarded loading instructions, is read in parallel with the first memory intended for receiving the loading instructions. This avoids a loss of synchronization in the execution of the instructions. According to one implementation of the method according to the invention, every time an instruction is extracted from the second memory, a second read counter is incremented. Likewise, every time an instruction is stored in the second memory, a second write counter is incremented.

Furthermore, every time an instruction modifying the value of a guard indication is stored in the second memory, the current value of the second write counter is stored in memory. The determining of the still-present character of a modifying instruction in the second memory takes account of the result of the comparison of the memory stored current value of the second write counter with the current value of the second read counter.

In other words, it is determined whether a modifying instruction which has already been written into the second memory is still present in this second memory, by using the comparison of the memory stored current value of the second write counter with the current value of the second read counter.

The second read counter and the second write counter advantageously have an identical binary size equal to the depth of the second memory. According to one implementation of the method, an overflow bit changing value every time the second corresponding counter comes back to its initial value is then associated with each second counter. Every time an instruction modifying the value of a guard indication is stored in the second memory, the current value of the overflow bit of the second write counter is likewise stored in memory. To take account of the fact that the read pointer and the write pointer of the second memory can lie in two different circular windows, the determining of the still-present character of the modifying instruction in the second memory also takes into account the result of the comparison of the current value of the overflow bit of the second read counter with the memory stored value of the overflow bit of the second write counter.

In regards to the transmission instructions, according to one implementation of the method according to the invention, every time a transmission instruction is stored in the third memory and another instruction is not simultaneously stored in the second memory, a non-operative instruction (NOP instruction) is simultaneously stored in the second memory so as not to de-synchronize the mechanisms. Furthermore, upon each storage of a transmission instruction, a second label including the current value of the second write counter, which was stored in a memory when the last instruction modifying the guard indication associated with the transmission instruction was stored in the second memory, is associated with the transmission instruction. The criteria for extraction of this transmission instruction having reached the head of the third memory then takes into account the result of the comparison between the memory stored current value associated with this transmission instruction (contained in the second label), and the current value of the second read counter.

In other words, the basic principle here is to compare the current value of the second read counter with the current value of the second write counter, which was stored in the memory when the last instruction modifying the guard indication associated with this transmission instruction was stored in the second memory. The basic principle includes authorizing the extraction of the transmission instruction having reached the head of the memory when the current value of the second read counter is higher than the memory stored current value contained in the label which was attached to this transmission instruction.

However, here again, it is appropriate to take account especially of the case where a modifying instruction is written while the second write counter is in a given circular window, and while the second read counter is still positioned in the preceding circular window. To resolve such special cases, according to one implementation of the method according to the invention, every time a transmission instruction is stored in the third memory, the current value of the overflow bit of the second write counter, which was stored in the memory when the last instruction modifying the guard indication associated with the transmission instruction was stored in the second memory, is associated with it and also with its second label. The criteria for extraction likewise takes into account the result of the comparison between this memory stored current value of the overflow bit of the second write counter contained in the second label attached to this transmission instruction, and the current value of the overflow bit of the second read counter.

Another aspect of the invention is to provide a processor with a decoupled architecture that comprises a core containing several processing units associated respectively with a FIFO-type memory for sequentially storing the respective instructions which are intended for the corresponding units. The processor core furthermore includes a central unit that is able, in response to an instruction for loading memory stored data into a register, to issue to the memory of a first processing unit an instruction for loading into the register, and to issue to the memory of a second processing unit an instruction intended to derive the memory stored data. The loading instruction is executed only when the memory stored data has been delivered by the second processing unit.

According to one general characteristic of the invention, the memory of the first unit includes a first FIFO-type memory and a second FIFO-type memory separate from the first one. The processor furthermore includes routing means (dispatcher) that is able to store each loading instruction in the first memory, and to store at least some of the other operative instructions intended for the first processing unit in the second memory.

First control means is capable of extracting from the second memory an operative instruction involving at least one register and having reached the head of this second memory if no earlier loading instruction intended to modify the value of the register or registers associated with this operative instruction is present in the first memory. In the presence of such an earlier load modifying instruction, the operative instruction is extracted from the second memory only after the load-modifying instruction has been extracted from the first memory.

According to one implementation of the invention, the first control means include a first read counter incremented every time an instruction is extracted from the first memory, a first write counter incremented every time an instruction is stored in the first memory, and a set of first individual registers associated respectively with the set of registers capable of being loaded by memory stored data.

The first control means further includes a first control unit able, whenever an instruction for loading into a register is stored in the first memory, to store the current value of the first write counter in a main field of the first individual register associated with this register, and a second control unit able to determine the still-present character of this instruction for loading into the first memory. This second control unit includes first comparison means able to compare the content of the main field of the first individual register with the current value of the first read counter.

According to one implementation of the invention, the first write counter and the first read counter have an identical binary size equal to the depth of the first memory. An overflow bit, changing value every time the first corresponding counter comes back to its initial value, is associated with each first counter. Each first individual register further includes a one-bit auxiliary field. The first control unit is then able, every time an instruction for loading into a register is stored in the first memory, also to store the current value of the overflow bit of the first write counter in the auxiliary field of the first corresponding individual register. The second control unit then includes first auxiliary comparison means able to compare the current value of the overflow bit of the first read counter with the content of the auxiliary field. These first auxiliary comparison means include an exclusive NOR logic gate (XNOR).

According to one embodiment of the invention, each stage of the second memory includes a field which may be used for the storage of an operative instruction, and a first supplementary field. This first supplementary field will make it possible to store a part of the first label attached to the operative instruction, which is typically the memory stored value of the first write counter.

The first control means then includes a third control unit able, every time an operative instruction involving at least one register is stored in the usable field of the input stage of the second memory, to select from among all the first individual registers associated with all the registers involved in the operative instruction, the one corresponding to the last (youngest) loading instruction modifying at least one of these registers. The first control means also transfers the content of the main field of the first selected individual register into the first supplementary field of the input stage of the second memory. The first control means also includes a fourth control unit able to derive the criteria for extraction of this operative instruction having reached the header stage of the second memory. This fourth control unit includes first comparison means able to compare the content of the first supplementary field of the header stage with the current value of the first read counter.

According to one embodiment of the invention, each stage of the second memory further includes a second supplementary field. This second supplementary field, for example, one supplementary bit, will make it possible to store another part of the first label attached to the operative instruction, which is typically the memory stored value of the overflow bit of the first write counter. The third control unit is then able, every time an operative instruction is stored in the usable field of the input stage of the second memory, to transfer the content of the auxiliary field of the first individual register selected into the second supplementary field of the input stage of the second memory. The fourth control unit then includes first supplementary comparison means able to compare the content of the second supplementary field with the current value of the overflow bit of the first read counter. Here again, these supplementary comparison means may include an exclusive NOR (XNOR) logic gate.

According to one embodiment of the invention, more particularly suitable for handling guarded instructions, the memory of the first unit includes a third FIFO-type memory, separate from the first and from the second memories, and a fourth FIFO-type memory, separate from the first three.

The first processing unit contains a guard indication register. The central unit is then able to issue a guarded instruction to the memory of another processing unit different from the first one, or else a guarded loading instruction to the first processing unit, and to issue to the memory of the first processing unit a transmission instruction intended to have the value of the guard indication associated with the guarded instruction or with the guarded loading instruction respectively transmitted to the other unit or to the fourth memory, respectively. Furthermore, the router means are able to store each transmission instruction in the third memory.

The processor further includes second control means able to extract from the third memory a transmission instruction having reached the head of this third memory if no modifying instruction which is earlier in time and intended to modify the value of the guard indication associated with this transmission instruction is present in the second memory, and in the presence of such an earlier modifying instruction, to extract the transmission instruction from the third memory only after the modifying instruction has been extracted from the second memory. According to one embodiment of the invention, the second control means include a second read counter incremented every time an instruction is extracted from the second memory, a second write counter incremented every time an instruction is stored in the second memory, and a set of second individual registers associated respectively with the set of guard indications.

The second control means further includes a fifth control unit able, every time an instruction modifying the value of a guard indication is stored in the second memory, to store the current value of the second write counter in a main field of the second individual register associated with this guard indication. A sixth control unit is able to determine the still-present character of this modifying instruction in the second memory. This sixth control unit includes second comparison means able to compare the content of the main field of the second individual register with the current value of the second read counter.

According to one embodiment of the invention, the second write counter and the second read counter have an identical binary size equal to the depth of the second memory. An overflow bit changing value every time the second corresponding counter comes back to its initial value is associated with each second counter. Each second individual register further includes an auxiliary, one-bit field.

The fifth control unit is then able, every time an instruction modifying the value of a guard indication is stored in the second memory, also to store the current value of the overflow bit of the second write counter in the auxiliary field of the second corresponding individual register. The sixth control unit then includes second auxiliary comparison means able to compare the current value of the overflow bit of the second read counter with the content of the auxiliary field. These second auxiliary comparison means include, for example, an exclusive NOR (XNOR) logic gate.

According to one embodiment of the invention, each stage of the third memory includes a field which may be used for the storage of a transmission instruction, and a first supplementary field. This first supplementary field will make it possible to store a part of the second label attached to the transmission instruction, which is typically the memory stored value of the second write counter.

The second control means then include a seventh control unit able, every time a transmission instruction is stored in the usable field of the input stage of the third memory, to transfer the content of the main field of the second individual register associated with the corresponding guard indication into the first supplementary field of the input stage of the third memory. An eighth control unit is able to derive the criteria for extraction of this transmission instruction having reached the header stage of the third memory. This eighth control unit includes second comparison means able to compare the content of the first supplementary field of the header stage with the current value of the second read counter.

According to one embodiment of the invention, each stage of the third memory further includes a second supplementary field. This second supplementary field, for example, one supplementary bit, will make it possible to store another part of the second label attached to the transmission instruction, typically the memory stored value of the overflow bit of the second write counter. The seventh control unit is then able, every time a transmission instruction is stored in the usable field of the input stage of the third memory, to transfer the content of the auxiliary field of the second individual register associated with the corresponding guard indication into the second supplementary field of the input stage of the third memory.

The eighth control unit then includes second supplementary comparison means able to compare the content of the second supplementary field with the current value of the overflow bit of the second read counter. Here again, the second supplementary comparison means may include an exclusive NOR (XNOR) logic gate.

BRIEF DESCRIPTION OF THE DRAWINGS

Other advantages and characteristics of the invention will emerge on examining the detailed description of implementations and embodiments, which are not in any way limiting, and the attached drawings, in which.

DETAILED DESCRIPTION OF THE PREFERRED EMBODIMENTS

Figure 1:
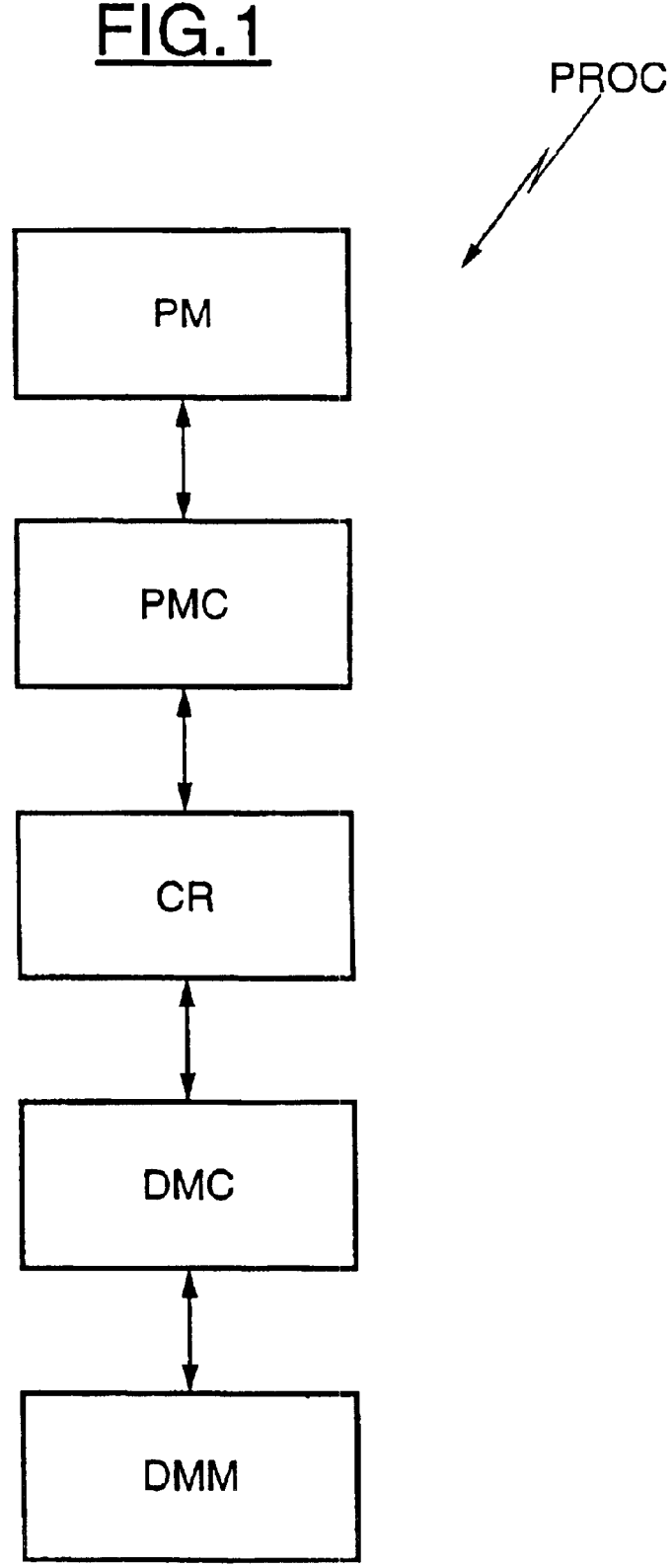
FIG. 1 diagrammatically illustrates the general architecture of a processor according to the invention.

In FIG. 1, the reference PROC designates a processor, for example, a processor for digital signal processing. The processor PROC includes a program memory PM containing the program instructions. This program memory is addressed by a memory controller PMC which interacts with the core CR of the processor. The core CR of the processor also communicates with a memory controller DMC which controls access to a data memory DMM, for example, two banks of an SRAM memory.

Figure 2:
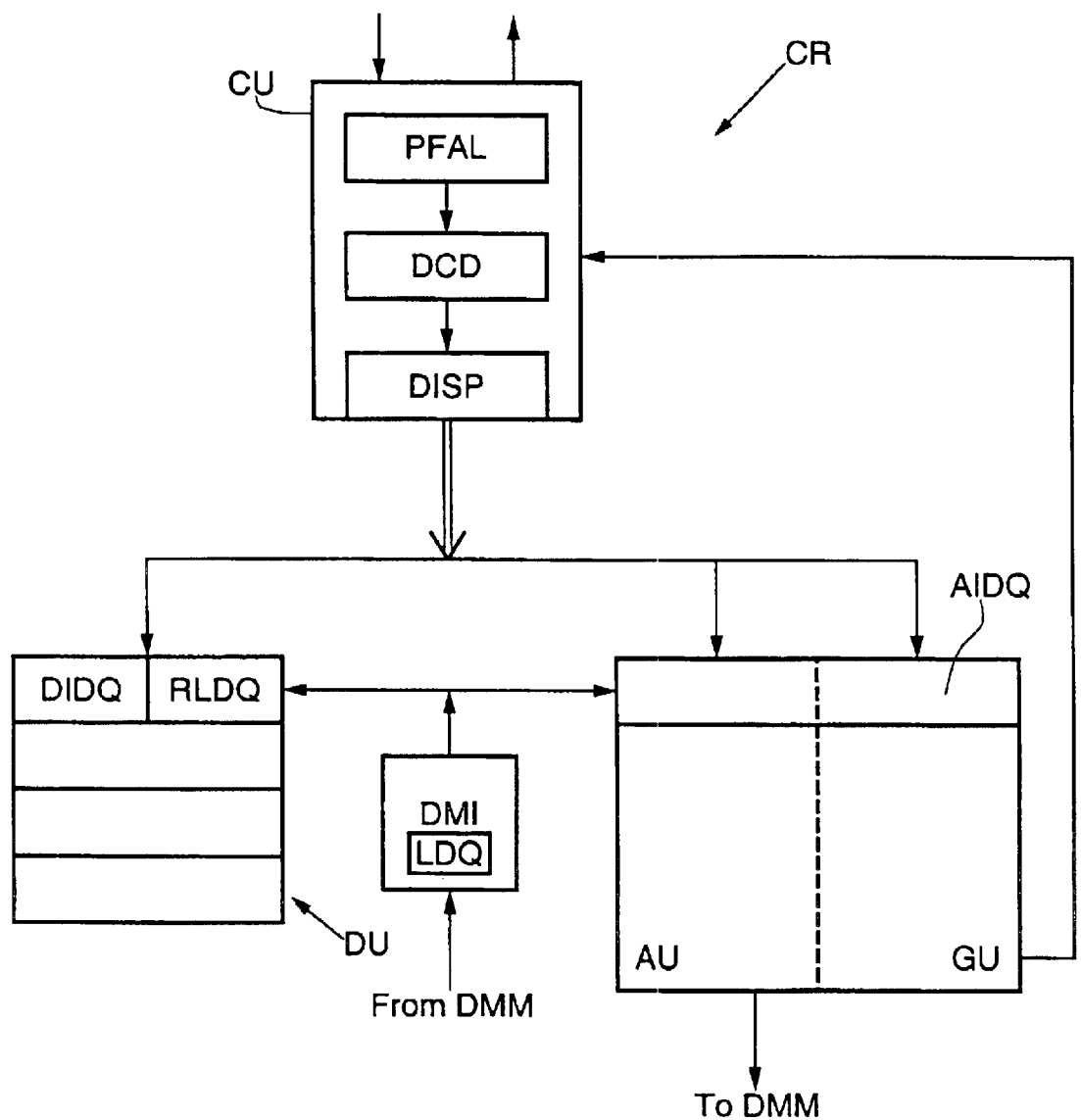
FIG. 2 illustrates, in more detail but still diagrammatically, the core of the processor of FIG. 1.

In FIG. 2, the core CR of the processor includes a central unit CU and several processing units, here three different processing units DU, AU and GU. In the embodiment illustrated in FIG. 2, no account is taken of the fact that the instructions can be guarded. Only the handling of the instructions for loading of memory stored data into a register will therefore be described, by reference to FIGS. 2 to 7.

The control unit CU is the master unit of the system. In general, it handles all the control activities. More particularly, it issues to the memory controller PMC program addresses, and distributes the corresponding instructions to the various processing units. More precisely, the central unit CU includes an interface PFAL with the memory controller PMC, which particularly carries out formatting of the instructions into instructions ready to be decoded. The instructions are then decoded in a decoder DCD which converts each machine instruction into one or more microinstructions which can be dealt with by the various processing units. In the remainder of the text, for the sake of simplification, the term instruction will designate a microinstruction.

Finally, a routing means DISP (Dispatcher) sends the instructions generated by the decoder to the processing units for which these instructions are intended. The processing units of the processor core includes an arithmetic and logic unit DU which executes the majority of the arithmetic operations.

The unit DU contains all the registers Rx for storing (load) memory stored data. These registers Rx may be sixteen in number, for example. An addressing unit AU is furthermore provided, which performs the actual address calculations necessary for addressing the operands in the memory. This unit AU contains all the pointing registers Px necessary for this task.

A third processing unit is a branching unit GU which carries out all the address-branching calculations and transfers them to the central unit CU. The processing unit DU includes a memory of the FIFO type that includes, as will be seen in further detail below, a first memory RLDQ intended to store loading instructions and a second memory DIDQ intended to store all the other instructions intended for this unit DU, in particular operative instructions DUOPx involving at least one register Rx.

In addition to these units DU, AU and GU, a memory interface DMI is provided, which contains another FIFO-type memory LDQ intended to receive and to store, temporarily, the data contained in the SRAM memory banks. Furthermore, in the same way as the unit DU includes a FIFO-type memory unit, each other processing unit, namely the unit AU and the unit GU, likewise contain a FIFO-type memory, referenced AIDQ, for storing the instructions intended for these processing units.

Figure 3:
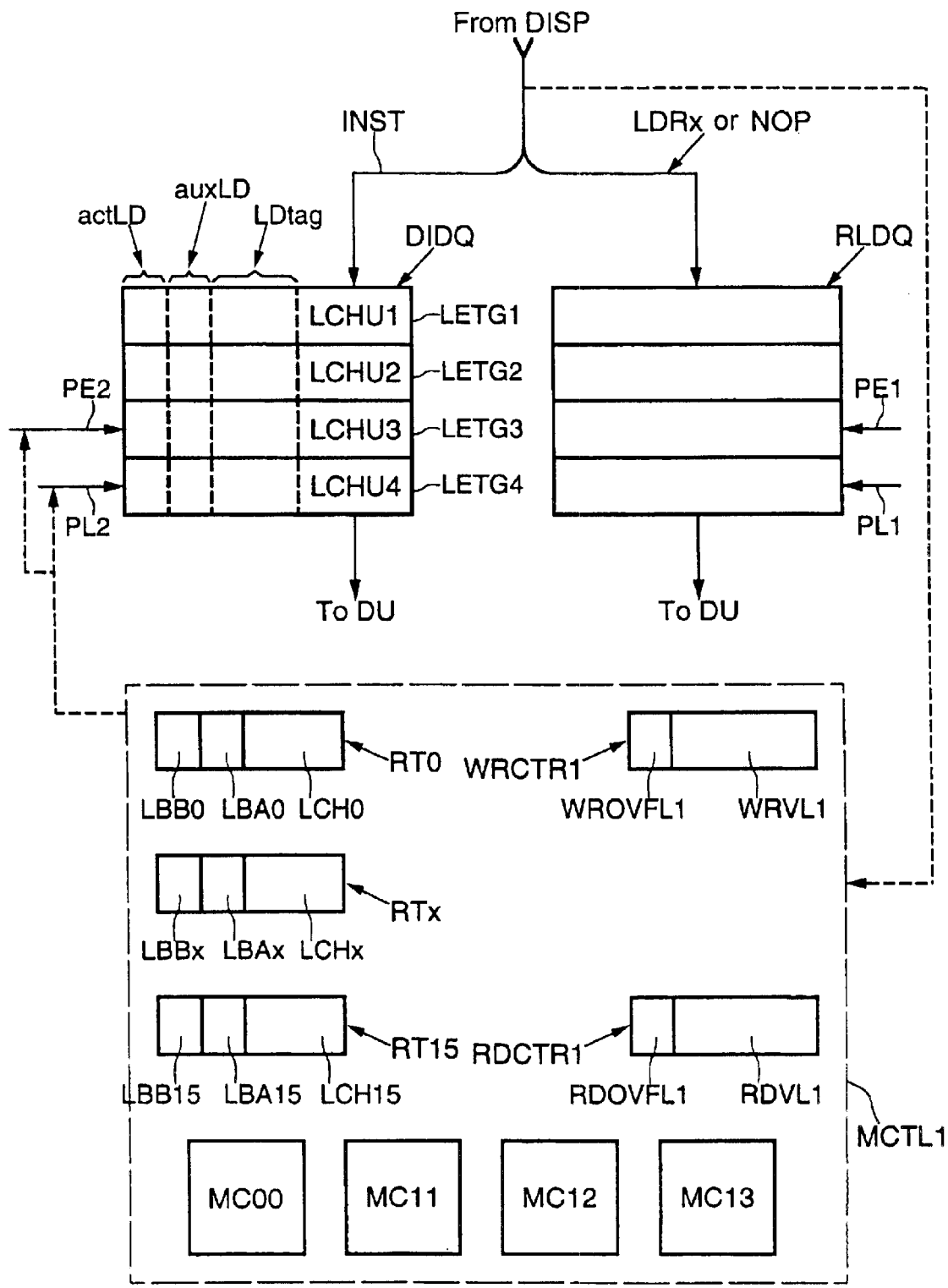
FIG. 3 illustrates, in more detail but still diagrammatically, an architecture allowing handling of the instructions for loading memory stored data into a register according to the invention.

Referring now more particularly to FIG. 3, the mechanism according to the invention for handling instructions for loading memory stored data into a register will be described. By way of example, an instruction for loading memory stored data into a register Rx is written: LD Rx, [Py]. This notation represents an instruction meaning that the memory stored data has to be loaded (stored) in the register Rx in the memory DMM at the address supplied by the content of the pointing register Py.

The central unit which receives such an instruction puts it into an instruction for dividing the memory stored data, intended for the addressing unit AU, and into a loading instruction intended for the unit DU. The deriving instruction will allow the unit AU, via the memory controller DMC, to read the data stored in memory at the address supplied by the pointer Py and to transfer this memory stored data to the memory LDQ.

The loading instruction LDRx, which is written Rx+LDQ, will allow the unit DU to load (store) in the register Rx the content of the memory LDQ. An operative instruction DUOPx involving a register Rx is, for example, an instruction of the type Rx=Rx+1, including, in this case, in incrementing the content of the register Rx by one unit. An operative instruction may involve more than one register, for example, 4 registers. Such an operative instruction is then, for example, R0=R1*R2+R3.

In the remainder of the text, the reference DUOPx designates an operative instruction, and x designates the number of the register Rx involved with this operative instruction. As indicated above, the memory associated with the unit DU includes a first FIFO-type memory, referenced RLDQ, and a second FIFO-type memory, referenced DIDQ. The second memory DIDQ is intended to store all the operative instructions INST intended for the unit DU, and especially DUOPx instructions.

This second memory DIDQ includes several stages (here four), referenced LETG1-LETG4. Each stage LETGi includes a usable field LCHUi for storage of an instruction INST. Writing and reading in the second memory DIDQ are managed by a write pointer PE2 and a read pointer PL2. An instruction INST which would have been stored in the stage LETG1 will then be propagated sequentially from the input stage LETG1 of the memory as far as the output stage LETG4, or header stage, of the memory DIDQ. Needless to say if, at a given instant, the FIFO is partially filled or empty, an instruction will be able to be stored directly at the first available stage, for example LETG2, or LETG3 or even LETG4, as is well known to those skilled in the art. Thus, in the sense of the present invention, the input stage is not necessarily the stage LETG1.

Each loading instruction LDRx involving a register Rx is stored in the first memory RLDQ. The writing and the reading in this first memory RLDQ are also handled conventionally by a write pointer PE1 and a read pointer PL1. The two memories, RLDQ and DIDQ have, in the example described here, the same depth (size) equal to four. It should also be noted that the pointers PE1 and PL1 associated with the memory RLDQ are decorrelated (that is, they are controlled independently) with respect to the pointers PE2 and PL2 associated with the memory DIDQ.

In addition to these FIFO-type memories, the processor includes first control means MCTL1, incorporated, for example, within the unit DU. These first control means, as will be seen in greater detail below, will make it possible in certain cases to issue the operative instructions DUOPx much more quickly to the pipelined processing stages of the unit DU.

More precisely, these first control means MCTL1 will extract from the memory DIDQ an operative instruction DUOPx having reached the header LETG4 of this memory DIDQ, if no loading instruction LDRx which is earlier in time and intended to modify the value of the register Rx associated with this operative instruction DUOPx is present in the memory RLDQ. These first control means MCTL1 will, in the presence of such an earlier loading instruction LDRx stored in the first memory RLDQ, extract the operative instruction DUOPx as soon as the loading instruction LDRx has been extracted from the memory RLDQ.

In one embodiment, like the one illustrated in FIG. 3, the first control means MCTL1 include a first read counter RDCTR1, which is circular, and is incremented every time an instruction, regardless of what it might be, is extracted from the second memory DIDQ. The means MCTL1 furthermore include a first write counter WRCTR1, which is also circular, and is incremented every time an instruction, regardless of what it might be, is stored in the second memory DIDQ.

In the example described here, the two counters have an identical size. This identical size is a number of bits necessary to code, in binary terms, the depth of the second memory DIDQ. In the example illustrated, since the memory DIDQ has a depth of four, the counters are counters over two bits, that is, the current value WRVL1 of the first write counter WRCTR1 and the current value RDVL1 of the first read counter RDCTR1 are two-bit words. Needless to say, the depth of the FIFO may be greater.

Furthermore, an overflow bit is associated with each first counter. WROVFL1 in the case of the first write counter and RDOVFL1 in the case of the read counter. This overflow bit changes value every time the first corresponding counter comes back to its initial value. In other words, at the rate of the successive circular counting windows, the overflow bit successively takes the values 0 and 1.

In addition to the first write counter and the first read counter, the first control means MCTL1 include a set of first individual registers RT0-RT15, associated respectively with the set of registers R0-R15. Thus, the individual register RTx is associated with the register Rx bearing the number x. Each individual register RTx includes a main field LCHx, as well as a first auxiliary field LDAx and a second auxiliary field LBBx. The meaning and the function of these auxiliary fields which, in the example described here, are one-bit fields, will be returned to in further detail.

Figure 4:
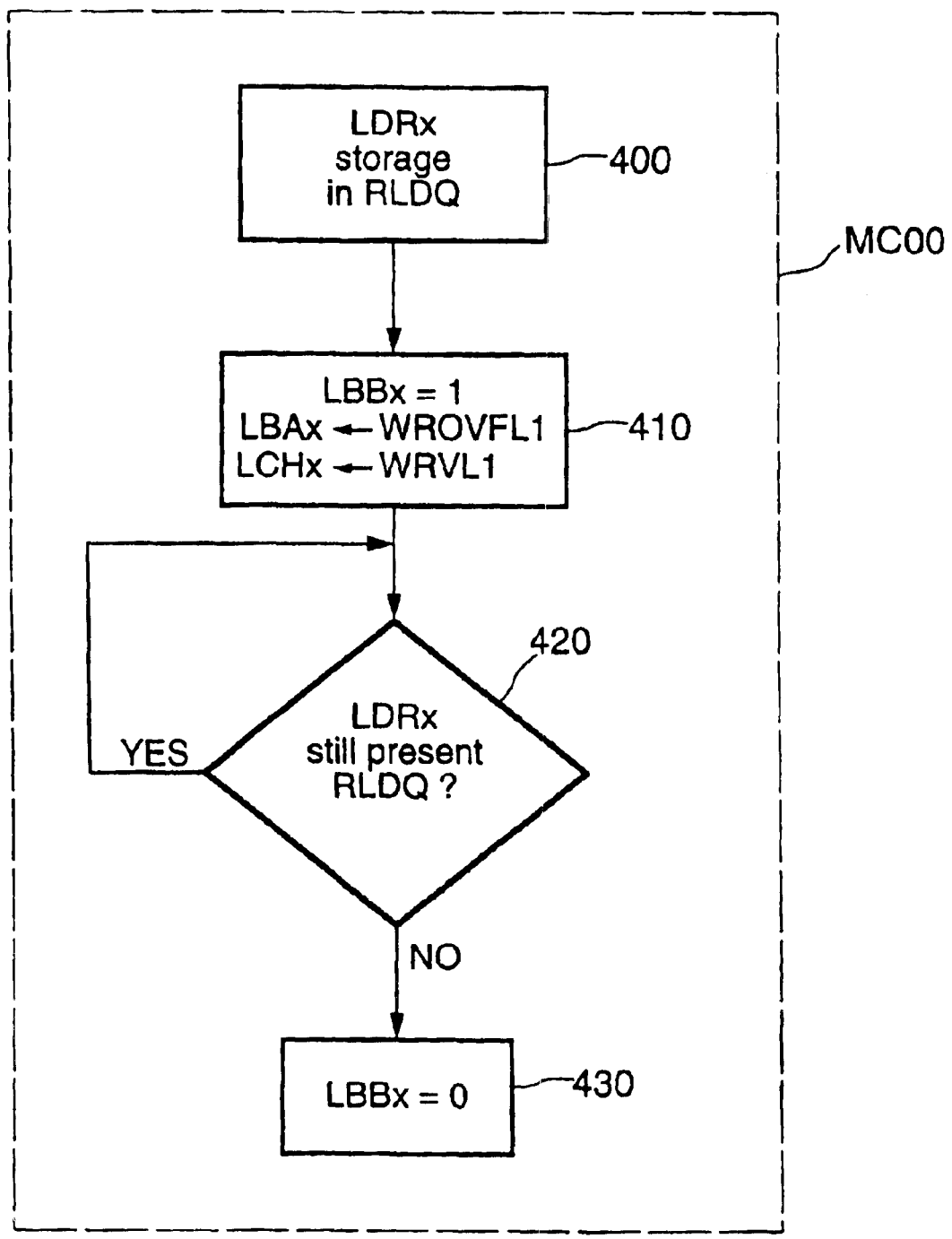
FIGS. 4 to 7 diagrammatically illustrate flowcharts relating to implementations of the method for handling instructions for loading memory stored data according to the invention.
Figure 5:
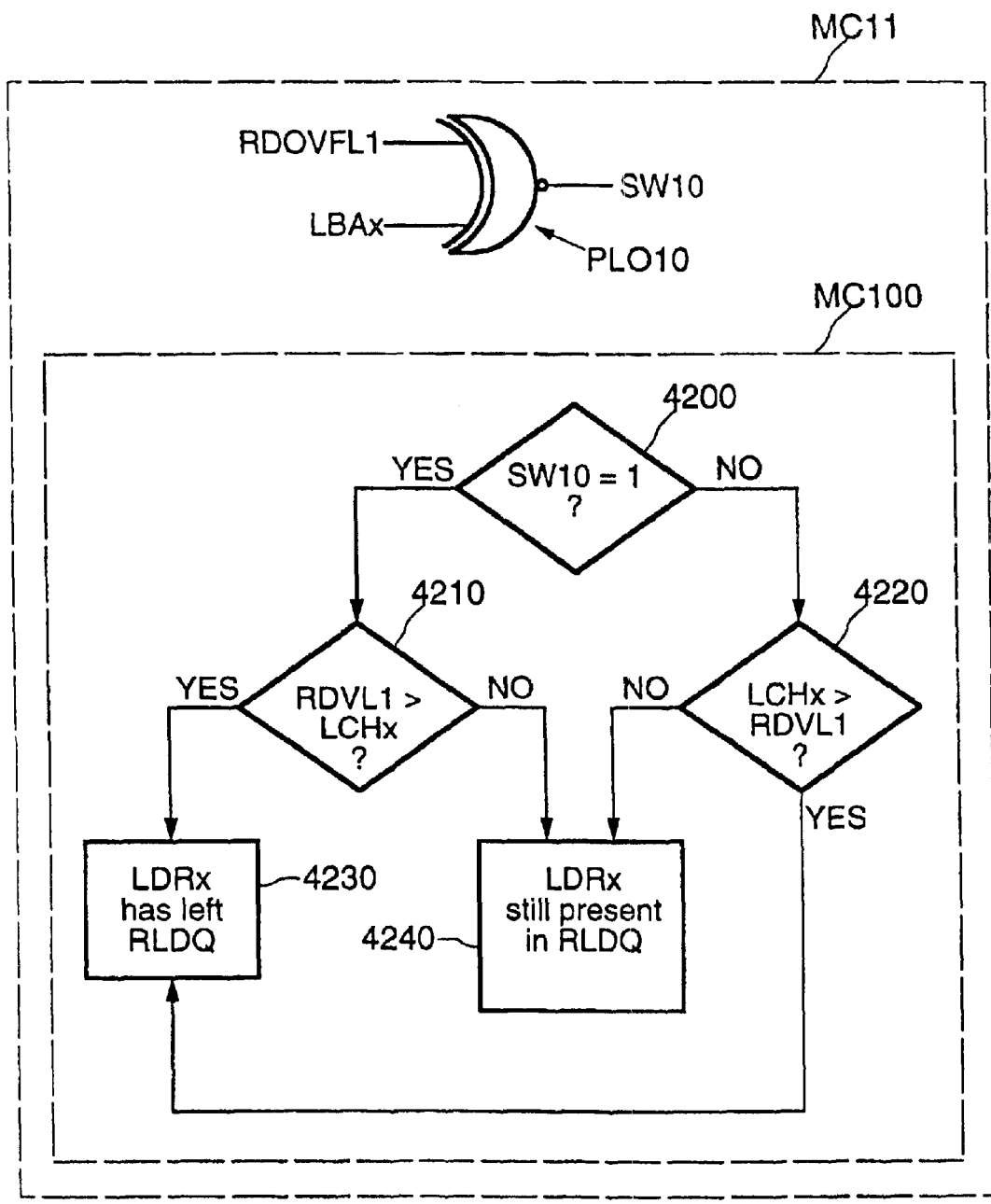

The first control means MCTL1 furthermore include four control units MC00-MC13, the functionality of which will now be described in more detail by referring to FIG. 4. The first control unit MC00 is able, every time a load instruction LDRx involving the register Rx is stored in the first memory RLDQ (stage 400, FIG. 4) to store the current value WRVL1 of the first write counter WRCTR1 in the main field LCHx of the first individual register RTx associated with the register Rx. Furthermore, the bit LBBx (second auxiliary field) of the first individual register RTx, initially at 0, takes the value 1 in order to indicate that a loading instruction LDRx has actually been stored in the memory RLDQ (stage 410).

Finally, the current value of the overflow bit WROVFL1 of the first write counter is stored in the first auxiliary field (1 bit) LBAx of the first individual register RTx. In fact, the value stored in the main field LCHx of the first individual register RTx, the size of which in terms of bits is equal to the depth of the first memory (here two bits), represents the symbolic position of the last loading instruction LDRx written into the memory RLDQ. The first auxiliary field LDAx, intended to receive the current value of the overflow bit of the first write counter, makes it possible to take into account and to manage the respective eventual positions of the pointers in the various circular counting windows.

In the stage 420, it will now be determined whether the loading instruction LDRx is still present in the memory RLDQ, or else whether it has left this memory. This is carried out by the second control unit MC11 and will now be described in more detail by referring more particularly to FIG. 5. Basically, the second control unit MC11 includes first comparison means MC100 which will compare the content of the main field LCHx of the first individual register RTx with the current value RDVL1 of the first read counter. This comparison will make it possible to determine whether the instruction LDRx is still present or has left the memory RLDQ.

To take into account the effects of the circular counting windows, provision is made for the second control unit MC11 also to include first auxiliary comparison means, here formed from a first exclusive NOR (XNOR) logic gate, referenced PLO10. This logic gate is intended to derive a first logic signal SW10 from the contents of the first auxiliary field LBAx and from the value of the overflow bit RDOVFL1 of the first read counter.

In other words, this logic signal SW10 indicates whether the read pointer PL2 is in the same circular window as the position of the last instruction LDRx affecting the register Rx. The value of the first logic signal SW10 is then tested in stage 4200. If this logic signal is at 0, there is a test in stage 4220 of whether the value of the word contained in the main field LCHX is strictly greater than the current value RDVL1 of the first read counter. If this is the case, then that means that the instruction LDRx has left the memory RLDQ (stage 4230) and the bit LBBx is then set to 0 (stage 430, FIG. 4).

If, in contrast, the value of the word contained in the main field LCHx is not strictly higher than the current value RDVL1 of the first read counter, then that means that the load instruction LDRx is still present in the memory RLDQ (stage 4240). In this case, the bit LBBx is kept at 1. If, in contrast, in the stage 4200 the logic signal SW10 is at 1, the first comparison means MC100 will test whether the current value of the first read counter RDVL1 is strictly higher than the word contained in the main field LCHx of the first individual register RTx (stage 4210). If this is the case, that means that the load instruction LDRx has left the memory RLDQ (stage 4230). In this case, the bit LBBx is set to 0 (stage 430, FIG. 4). In the opposite case, that means (stage 4240) that the load instruction LDRx is still present in the memory RLDQ.

Figure 6:
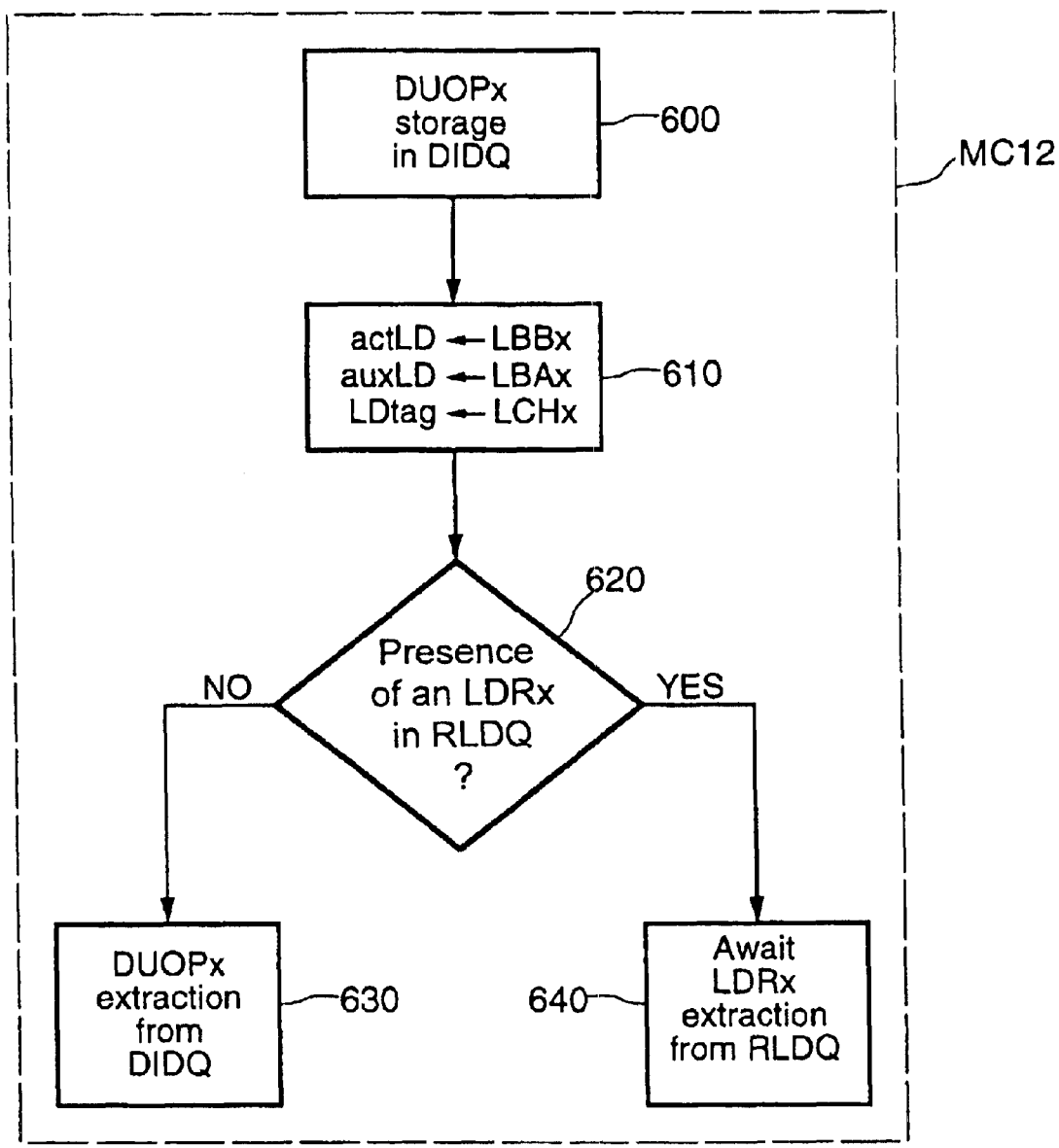
Figure 7:
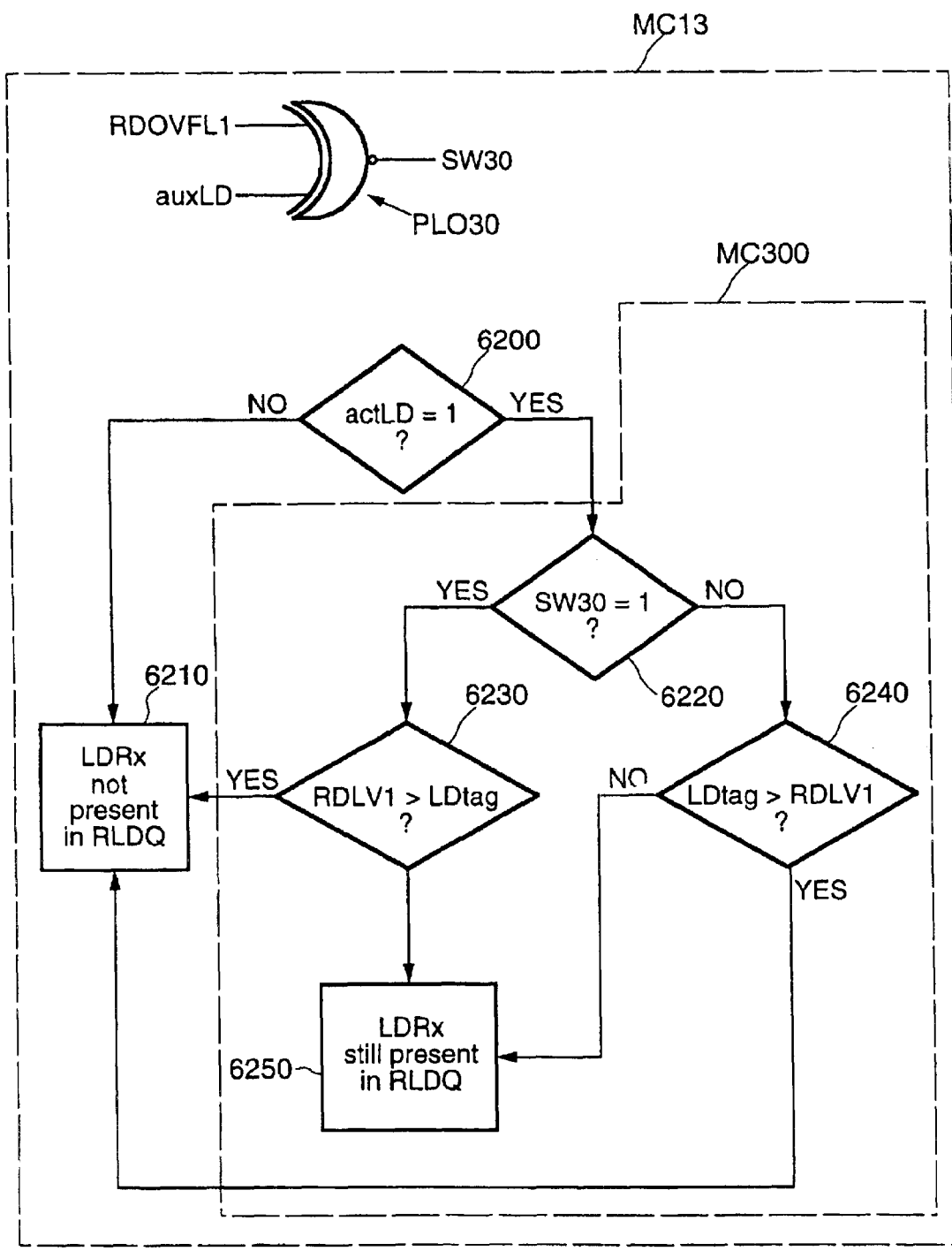

Referring more particularly to FIGS. 6 and 7, a description will now be given in more detail of the processing operations carried out when an operative instruction DUOPx is stored in the usable field LCHU1 of the input stage LETG1 of the memory DIDQ, as well as the deriving of its extraction criteria, when this operative instruction DUOPx has reached the header of the memory DIDQ, that is, when it is present in the usable field LCHU4 of the output stage LETG4.

For the sake of simplification, it is assumed, in the first place, that the operative instruction DUOPx involves only one register, namely the register Rx. To not distort the correct time-based synchronization of the processing operations, every time an operative instruction DUOPx is stored in the memory DIDQ, and if, simultaneously, a loading instruction is not stored in the memory RLDQ, a non-operative instruction NOP is also stored in the memory RLDQ. As is known to those skilled in the art, a NOP instruction does not alter the content of the architectural registers of the processor core.

Furthermore, every time an operative instruction DUOPx is stored in the memory DIDQ, for example, in the usable field LCHU1 of the stage LETG1, a label is associated with it which corresponds to the content of the corresponding individual register RTx. This label will continually be attached to the operative instruction DUOPx in the memory DIDQ. In practice (FIG. 3), the label associated with an operative instruction DUOPx is formed in each stage of the memory DIDQ by a first supplementary field LDtag, a second supplementary field (1 bit) AuxLD, and a third supplementary field (likewise 1 bit) ActLD.

When an operative instruction DUOPx is stored in the header stage of the memory DIDQ (stage 600, FIG. 6), the third control unit MC12 transfers (stage 61, FIG. 6) the content of the main field LCHx into the first supplementary field LDtag, the content of the first auxiliary field LBAx into the second supplementary field AuxLD, and the content of the second auxiliary field LBBx into the third supplementary field ActLD.

The content of this label will remain unchanged during the propagation of the instruction DUOPx to which it is attached, until this instruction reaches the header of the memory DIDQ. At that instant, the fourth control unit MC13 will test (stage 620) for the presence or the absence of a loading instruction LDRx which is earlier in time in the memory RLDQ.

If a loading instruction LDRx is present, then the third control unit MC12 will wait, in order to extract the operative instruction from the memory DIDQ, for the loading instruction LDRx to be extracted from the memory RLDQ (stage 640). If, in contrast, no instruction LDRx is detected in the memory RLDQ, the third control unit MC12 will immediately extract the operative instruction DUOPx from the header of the memory DIDQ (stage 630). It is the fourth control unit MC13 which will derive the criteria for extraction of this operative instruction DUOPx having reached the header of the second memory.

To determine whether a loading instruction LDRx is present in the memory RLDQ, the unit MC13 will first of all test the value of the bit ActLD of the label attached to the operative instruction DUOPx (stage 6200, FIG. 7). If this bit ActLD is equal to 0, then that means that no instruction LDRx which is earlier in time than the instruction DUOPx is present in the memory RLDQ (stage 6210). In this case, the operative instruction DUOPx can be immediately extracted from the memory DIDQ (stage 630, FIG. 6).

If, in contrast, the bit ActLD is at 1, then it is basically appropriate to compare the content of the first supplementary field LDtag with the current value RDVL1 of the first read counter. This is the role of the second comparison means MC300. Basically, an absence of an LDRx instruction is expressed by a value RDVL1 which is strictly higher than the first supplementary field LDtag. Here again, that being so, it is appropriate to take into account the effects of the circular counting windows.

It is for this reason that provision is made for the control unit MC13 to include first supplementary comparison means, here formed from a second exclusive NOR logic gate referenced PLO30, and able to compare the bit AuxLD with the overflow bit RDOVFL1 of the first read counter. The result of this comparison supplies a second logic signal SW30. This signal SW30 indicates whether the read pointer PL1 of the first memory RLDQ is in the same circular window as the position of the last loading instruction LDRx, potentially having an effect on the operative instruction DUOPx.

If the signal SW30 is at 1, then the operative instruction DUOPx could be transmitted if the value RDVL1 is higher than LDtag (stage 6230, FIG. 7). In the opposite case, that means that an instruction LDRx is still present in the first memory RDLQ (stage 6250). It is appropriate to wait before extracting the operative instruction DUOPx from the header of the memory DIDQ. If the signal SW30 is at 0, then it is possible to extract the operative instruction DUOPx if the value of the word LDtag is strictly higher than the value of the first read counter RDVL1 (stage 6240). In the opposite case, it is appropriate to wait (stage 6250).

In hardware terms, the various control units MC10-MC13 can be produced in the form of an integrated circuit by using logic-synthesis tools. In the case in which an operative instruction DUOPxy involves more than one register, for example, 2 registers Rx and Ry, the third control unit MC12 will, when the operative instruction is stored in the second memory DIDQ, select from among all the first individual registers RTx, RTy associated with all the registers Rx, Ry involved with the operative instruction DUOPxy that one corresponding to the last (that is, the youngest in time) load instruction modifying at least one of these involved registers.

It is then the content of the main field of the first individual register selected, for example, RTx, which will be transferred into the first supplementary field LDTag of the input stage of the memory DIDQ. In hardware terms, the various control units MC00-MC13 can be produced in the form of an integrated circuit by using logic-synthesis tools. The embodiment which has been described allows a very straightforward implementation of the method according to the invention. It should also be noted that the depth of the memory RLDQ can be different from that of the memory DIDQ.

Figure 8:
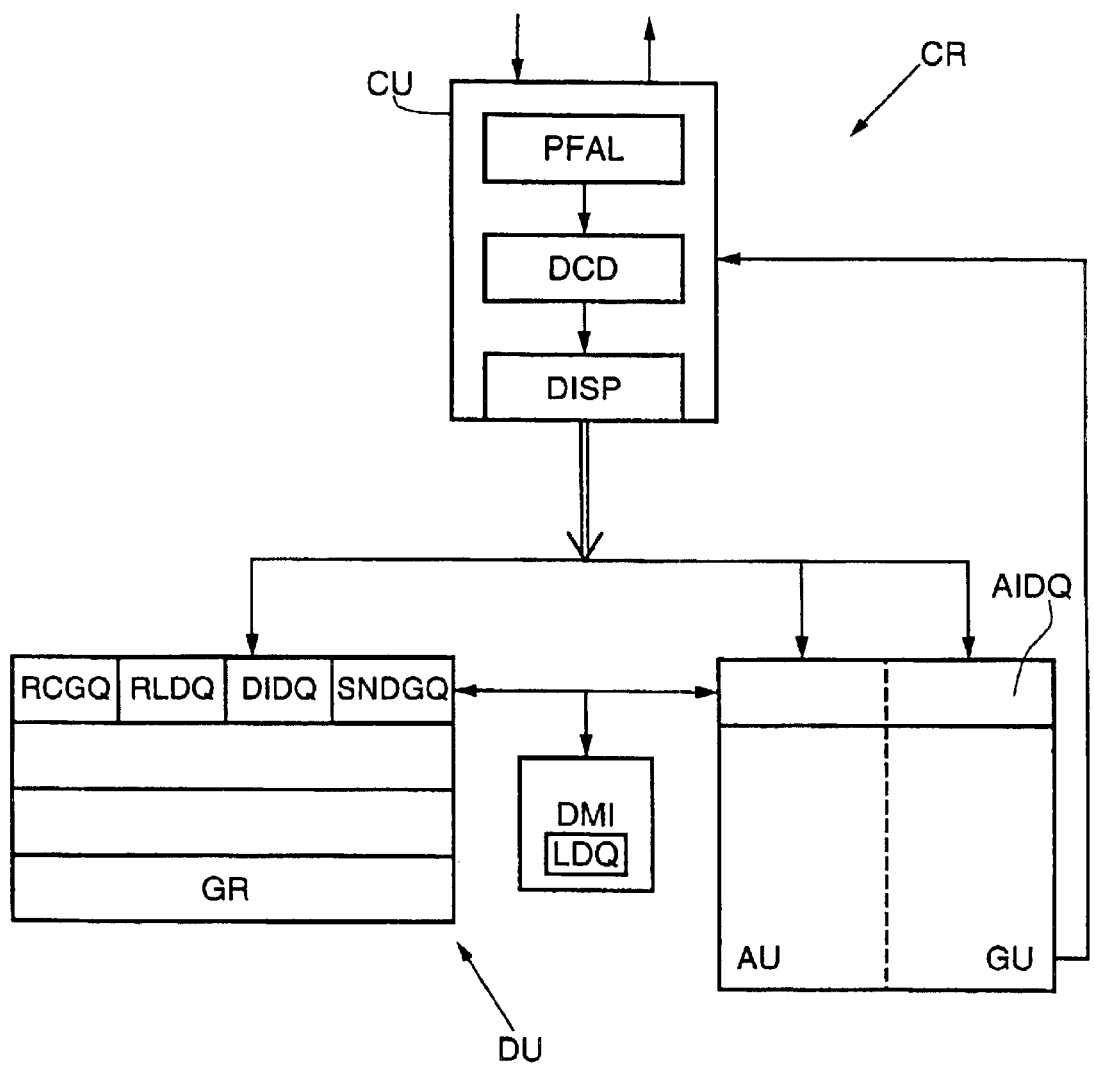
FIG. 8 illustrates, in more detail but still diagrammatically, an embodiment further allowing handling of guarded instructions according to the invention.

Furthermore, everything which has just been described for a register Rx is carried out in parallel simultaneously for all the registers. In the embodiment illustrated in FIG. 8, it is assumed now that the operation of the processor incorporates the principle of guarded instructions. The guarded instructions may be intended for processing units other than the unit DU, for example, unit AU or the unit GU. They may also be intended for the processing unit DU. Among the guarded instructions intended for the processing unit DU are found guarded instructions for loading memory stored data into a register.

The memory of the unit DU further includes, as will be seen in detail below, a third memory SNDGQ intended to store transmission instructions and a fourth memory RCGQ intended to store all the guard indication values associated with the guarded loading instructions, and originating from the guard indication register GR. The unit DU includes the guard indication register GR. This register stores the current values of all the guard indications, which are, for example, equal to sixteen in number. It is reiterated here that a guarded instruction means that this instruction is allocated a guard indication, taken from among the sixteen guard indications of the register GR, and depending on the value of this guard indication, the instruction may be executed.

A particularly advantageous mechanism for handling these guarded instructions, according to the invention, will now be described by reference more particularly to FIG. 9. When a guarded instruction is issued to the memory AIDQ of a processing unit, for example the unit AU or the unit GU which does not hold the guard indication register GR, this issuing causes the issue to the memory of the processing unit DU which contains the guard indication register of an instruction called a transmission instruction. The transmission instruction is intended to have the value of the guard indication associated with the guarded instruction which has been issued to the unit AU or GU transmitted to the unit AU or GU.

Furthermore, when a guarded loading instruction is issued to the unit DU, a transmission instruction SNDGx intended to have the value of the guard indication associated with the guarded instruction transmitted to the fourth memory REGQ is also stored in the memory SNDGQ. In contrast, any other guarded instruction, for example, a guarded operative instruction issued to the unit DU is stored in the memory DIDQ and does not give rise to the issuing of a transmission instruction SNDGx.

Figure 9:
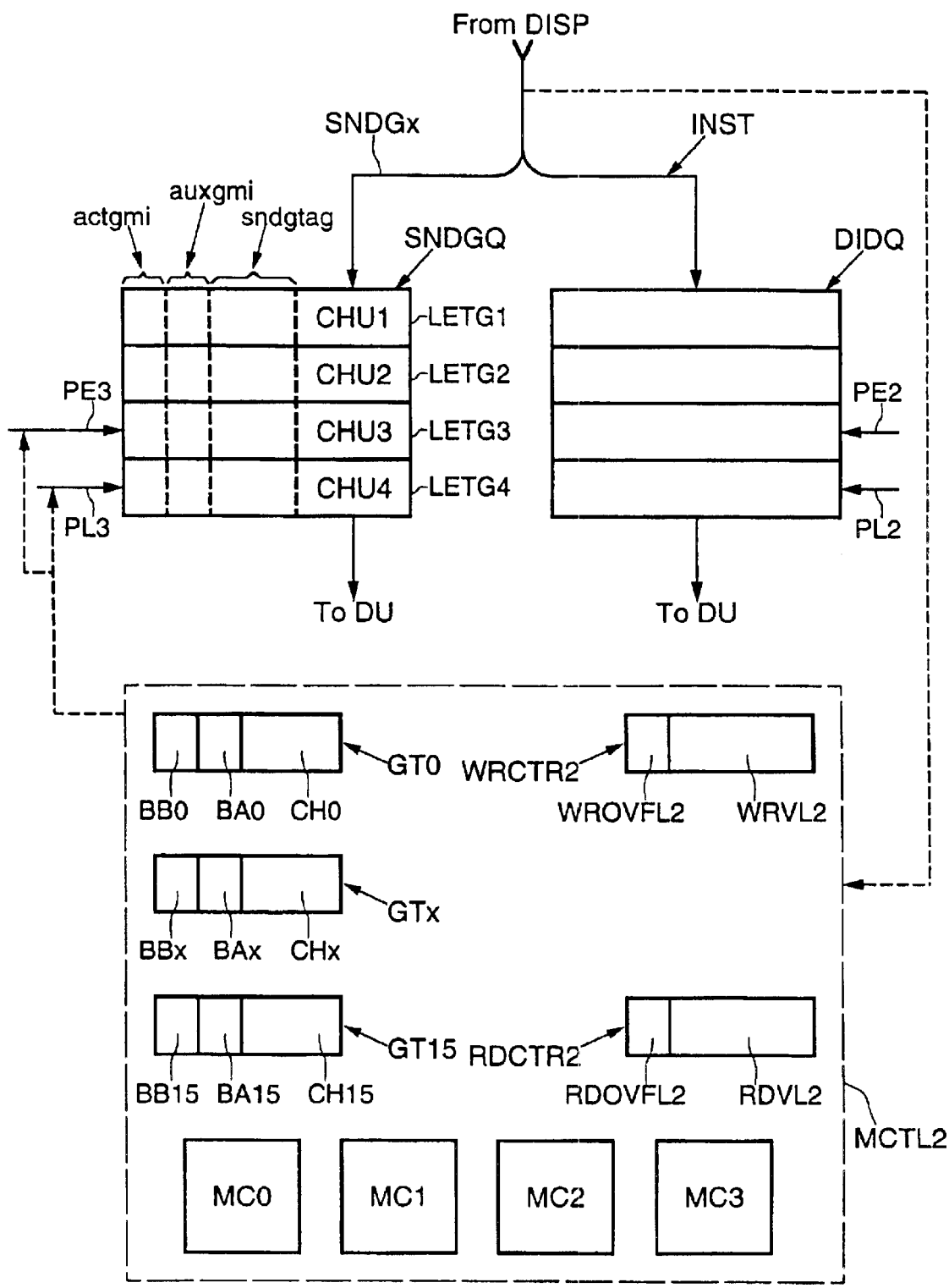
FIGS. 9 to 13 diagrammatically illustrate flowcharts relating to implementations of the handling of guarded instructions according to the invention.

In FIG. 9, the reference SNDGx designates such a transmission instruction, and x designates the number of the guard indication Gx associated with the guarded instruction which has been issued to one of the units AU or GU, or else associated with a guarded loading instruction which can be that referenced LDRx (involving the register Rx), or else referenced LDRy (involving a register Ry). In the remainder of the text, for the sake of simplification, it will be assumed that the indication Gx is associated with the instruction LDRx, if appropriate.

The third memory SNDGQ includes several stages (e.g., four), referenced ETG1-ETG4. Each stage ETGi includes a usable field CHUi for storage of a transmission instruction SNDGx. The writing and the reading in the third memory SNDGQ are managed by a write pointer PE3 and a read pointer PL3. A transmission instruction SNDGx which would have been stored in the stage ETG1 will then be propagated sequentially from the input stage ETG1 of the memory up to the output stage ETG4, or header stage, of the memory SNDGQ. Needless to say if, at a given instant, the FIFO is partially filled or empty, and an instruction could be stored directly at the first available stage, for example ETG2 or ETG3 or even ETG4, as is well known to those skilled in the art. Hence, in the sense of the present invention, the input stage is therefore not necessarily the stage ETG1.

The second memory DIDQ is intended to store all the other instructions INST intended for the unit DU, with the exception of the loading instructions LDRx, and especially the instructions known as modifying instructions, that is, those intended to modify the value of a guard indication stored in the guard indication register GR. A modifying instruction intended to modify the value of the guard indication bearing the number x is referenced in the rest of the text by GMIx.

The two memories SNDGQ and DIDQ have, in the example described here, the same depth (size) equal to four. It should also be noted that the pointers PE3 and PL3 associated with the memory SNDGQ are decorrelated (that is, controlled independently) with respect to the pointers PE2 and PL2 associated with the memory DIDQ.

The processor includes second control means MCTL2, for example incorporated within the unit DU. These second control means, as will be seen in more detail below, will make it possible to issue the transmission instructions SNDGx much more rapidly to the pipelined execution stages of the unit DU, and consequently to the guard indication register GR, so as to allow the issuing of the value of the guard indication associated with the guarded instruction which is awaiting execution in the memory associated with another processing unit, for example, the unit GU or else in the memory RLDQ.

More precisely, these second control means MCTL2 will extract, from the memory SNDGQ, a transmission instruction SNDGx having reached the header ETG4 of this memory SNDGQ, if no instruction GMIx which is earlier in time and intended to modify the value of the guard indication Gx associated with this transmission instruction SNDGx is present in the memory DIDQ. These control means MCTL2, in the presence of such a modifying instruction GMIx earlier in time stored in the second memory DIDQ, will extract the transmission instruction SNDGx as soon as the modifying instruction GMIx has been extracted from the memory DIDQ.

In one embodiment, like the one illustrated in FIG. 9, the second control means MCTL2 include a second read counter RDCTR2, that is circular, and is incremented every time an instruction, regardless of what it may be, is extracted from the second memory DIDQ. The means MCTL2 further include a second write counter WRCTR2, that is also circular, and is incremented every time an instruction, regardless of what it may be, is stored in the second memory DIDQ.

In the example described here, the two counters have an identical size. This identical size is a number of bits necessary to code, in binary mode, the depth of the second memory DIDQ. In the example illustrated, since the memory DIDQ has a depth of four, the second counters are counters over two bits, that is, the current value WRVL2 of the second write counter WRCTR2 and the current value RDVL2 of the second read counter RDCTR2 are two-bit words. Needless to say, the depth of the FIFO may be greater.

Furthermore, an overflow bit (WROVFL2 in the case of the write counter and RDOVFL2 in the case of the read counter) is associated with each second counter. This overflow bit changes value every time the corresponding counter comes back to its initial value. In other words, at the rate of the successive circular counting windows, the overflow bit successively takes the values 0 and 1.

In addition to the write counter and the read counter, the control means MCTL2 include a set of individual registers GT0-GT15, associated respectively with the set of the guard indications G0-G15. Thus, the individual register GTx is associated with the guard indication Gx bearing the number x. Each individual register GTx includes a main field CHx, as well as a first auxiliary field BAx and a second auxiliary field BBx. The meaning and the function of these auxiliary fields which, in the example described here, are one-bit fields, will be returned to in further detail.

Figure 10:
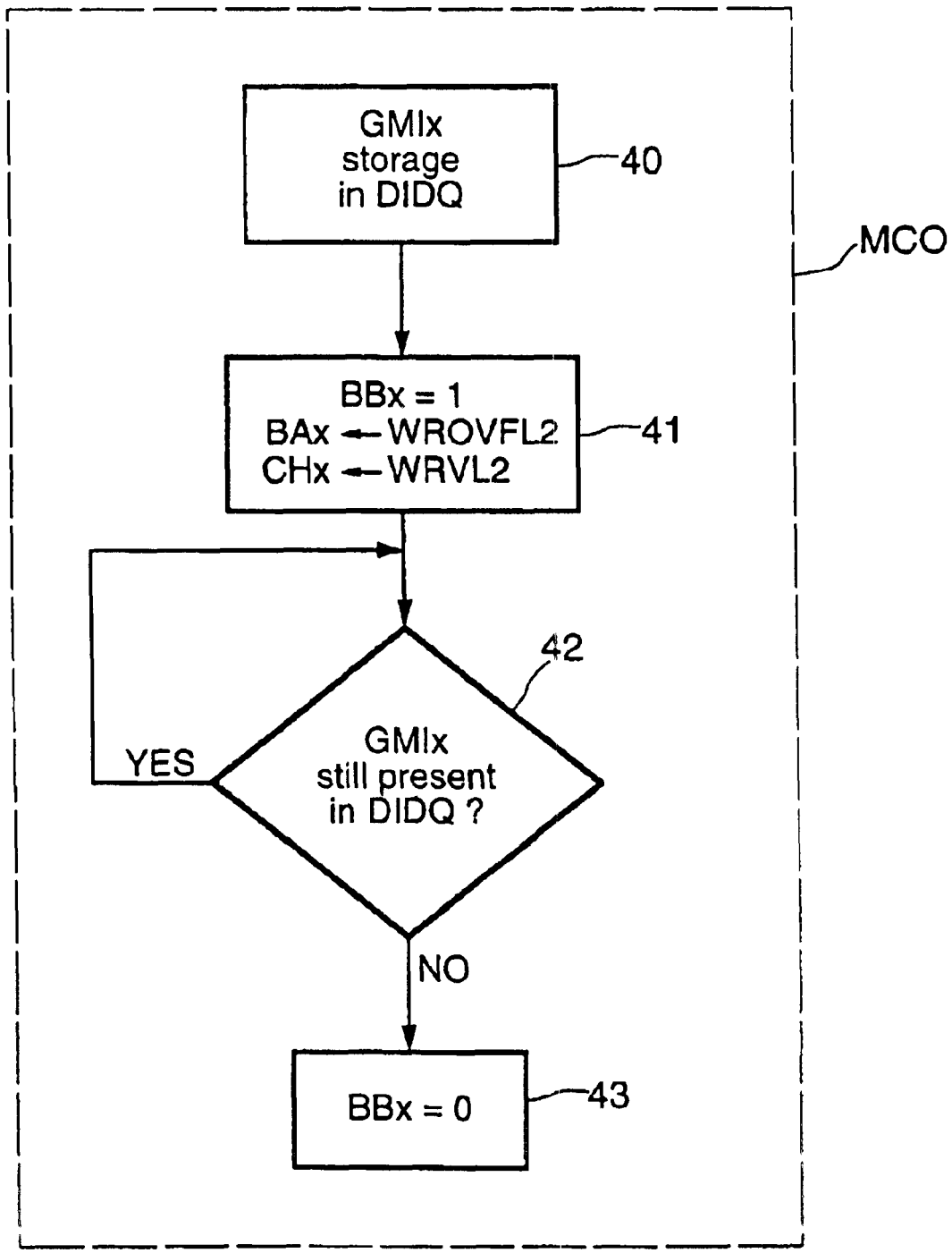

The control means MCTL2, furthermore, include four control units MC0-MC3 the functionality of which will now be described in more detail by referring to FIG. 10. The fifth control unit MC0 is able, every time an instruction GMIx modifying the value of the guard indication Gx is stored in the second memory DIDQ (stage 40, FIG. 10), to store the current value WRVL2 of the write counter WRCTR2 in the main field CHx of the individual register GTx associated with the guard indication Gx. Furthermore, the bit BBx (second auxiliary field) of the individual register GTx, initially at 0, takes the value 1 to indicate that a modifying instruction GMIx has actually been stored in the memory DIDQ (stage 41). Finally, the current value of the overflow bit WROVFL2 of the write counter is stored in the first auxiliary field (one bit) BAx of the individual register GTx.

In fact, the value stored in the main field CHx of the individual register GTx, the size of which in terms of bits is equal to the depth of the second memory (here two bits), represents the symbolic position of the last modifying instruction GMIx written into the memory DIDQ. The first auxiliary field BAx, intended to receive the current value of the overflow bit of the write counter, makes it possible to take into account and to manage the respective eventual positions of the pointers in different circular counting windows.

Figure 11:
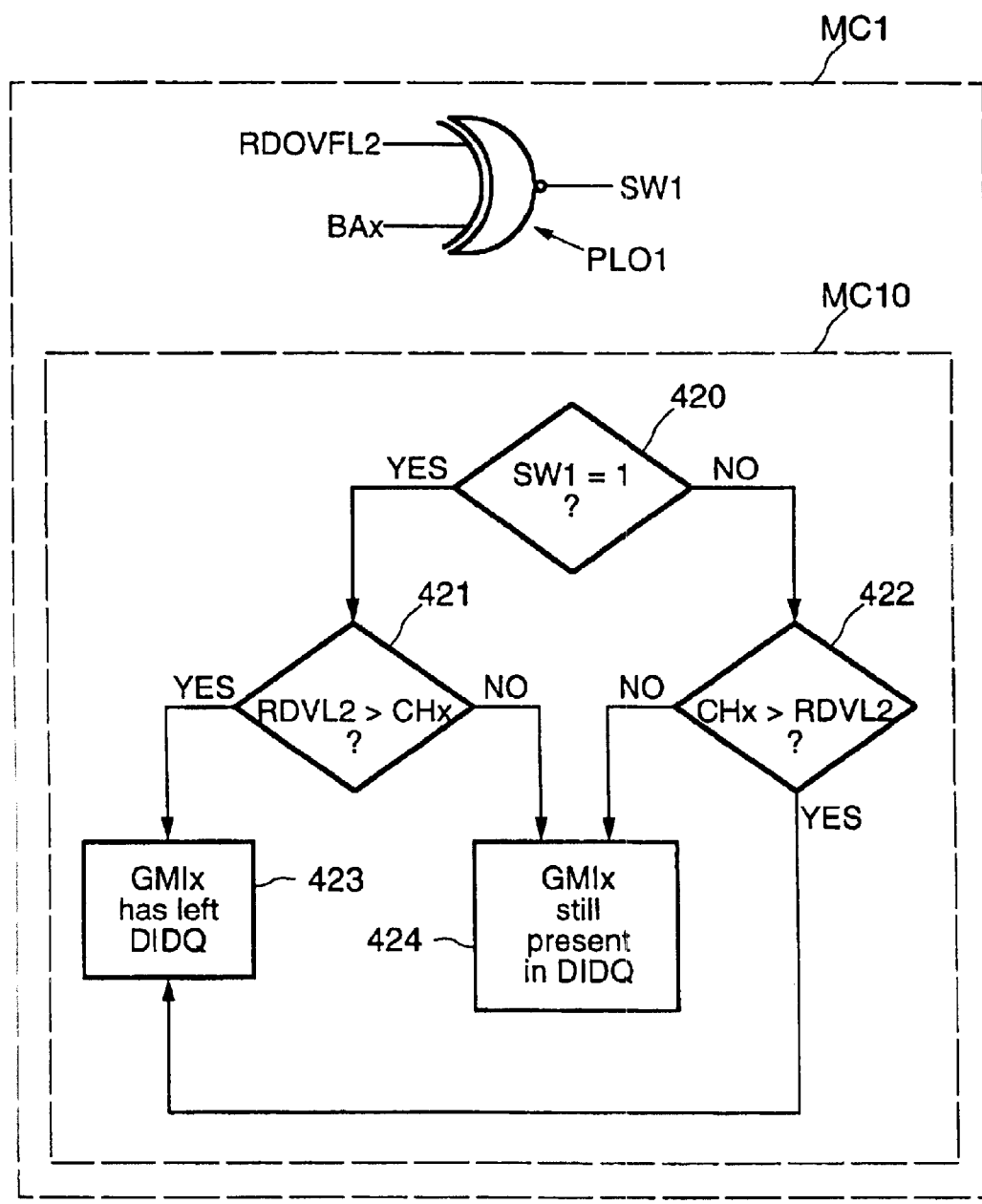

In stage 42, it will now be determined whether the modifying instruction GMIx is still present in the memory DIDQ, or whether it has actually left this memory. This is carried out by the sixth control unit MC1 and will now be described in more detail by referring more particularly to FIG. 11. Basically, the sixth control unit MC1 includes second comparison means MC10 which will compare the content of the main field CHx of the individual register GTx with the current value RDVL2 of the read counter. This comparison will make it possible to determine whether the instruction GMIx is still present or has left the memory DIDQ.

To take into account the effects of the circular counting windows, provision is made for the sixth control unit MC1 also to include second auxiliary comparison means, here formed from a first exclusive NOR (XNOR) logic gate, referenced PLO1. This logic gate is intended to derive a first logic signal SW1 from the content of the first auxiliary field Bax, and from the value of the overflow bit RDOVFL2 of the read counter.

In other words, this logic signal SW1 indicates whether the read pointer PL2 is in the same circular window as the position of the last instruction GMIx affecting the guard indication Gx. The value of the first logic signal SW1 is then tested in stage 420. If this logic signal is at 0, it is tested in stage 422 whether the value of the word contained in the main field CHx is strictly higher than the current value RDVL2 of the read counter. If this is the case, then that means that the instruction GMIx has left the memory DIDQ (stage 423), and the bit BBx is then set to 0 (stage 43, FIG. 10).

If, in contrast, the value of the word contained in the main field CHx is not strictly higher than the current value RDVL2 of the read counter, then that means that the modifying instruction GMIx is still present in the memory DIDQ (stage 424). In this case, the bit BBx is kept at 1. If, in contrast, in stage 420 the logic signal SW1 is at 1, the comparison means MC10 will test whether the current value of the read counter RDVL2 is strictly higher than the word contained in the main field CHx of the individual register GTx (stage 421). If this is the case, that means that the modifying instruction GMIx has left the memory DIDQ (stage 423). In this case, the bit BBx is set to 0 (stage 43, FIG. 10). In the opposite case, that means (stage 424) that the modifying instruction GMIx is still present in the memory DIDQ.

Figure 12:
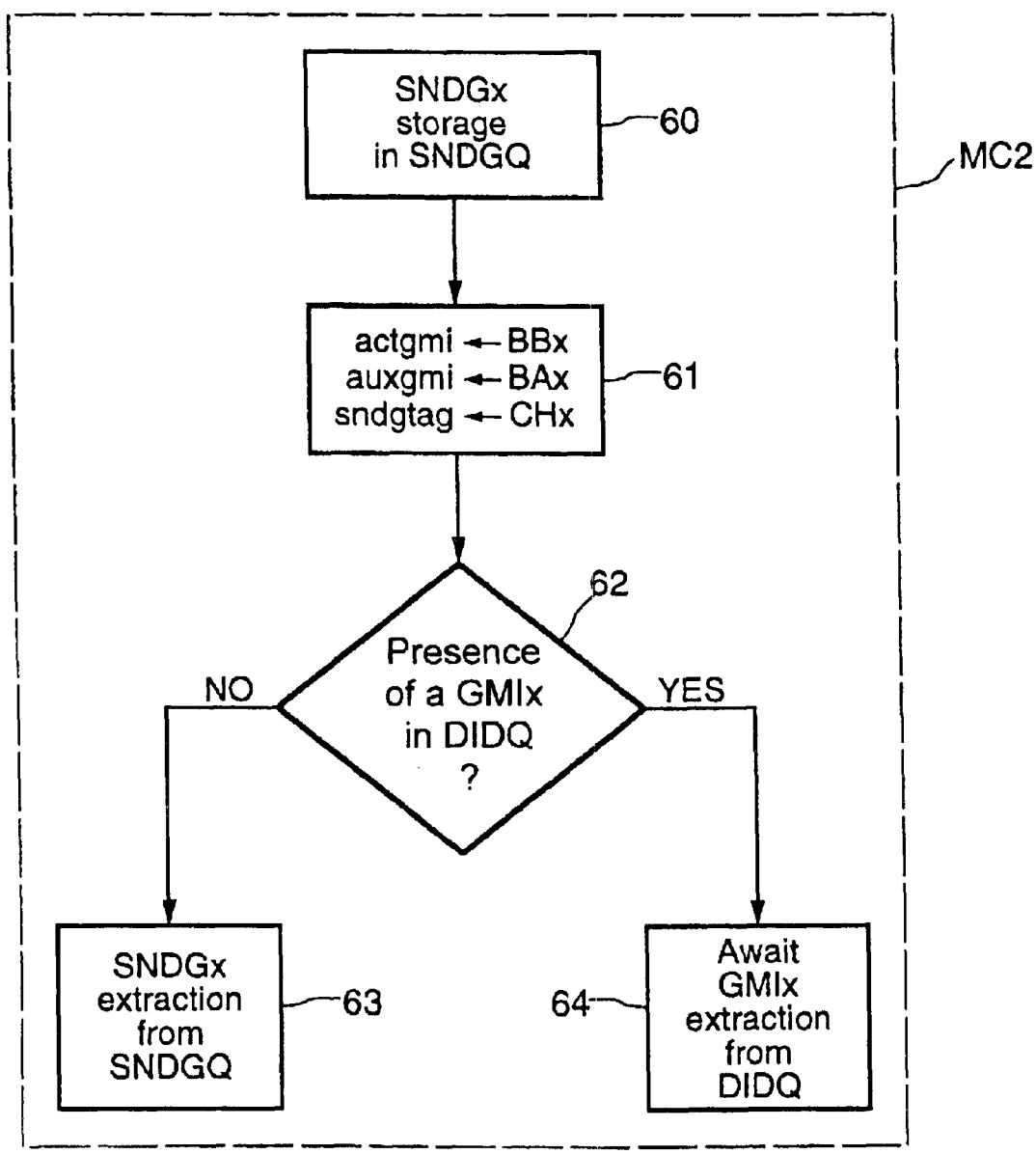

A more detailed description will now be given, referring more particularly to FIGS. 12 and 13, of the processing operations carried out when a transmission instruction SNDGx is stored in the usable field CHU1 of the input stage ETG1 of the memory SNDGQ, as well as the deriving of its extraction criteria, when this transmission instruction SNDGx has reached the header of the memory SNDGQ. That is, when it is present in the usable field CHU4 of the output stage ETG4.

In order not to disturb the correct time-based synchronization of the processing operations, every time a transmission instruction SNDGx is stored in the memory SNDGQ and when another instruction is not simultaneously stored in the memory DIDQ, a non-operative instruction NOP is also stored in the memory DIDQ.

Furthermore, every time a transmission instruction SNDGx is stored in the memory SNDGQ, for example, in the usable field CHU1 of the stage ETG1, a label is associated with it which corresponds to the content of the corresponding individual register GTx. This label will be continually attached to the transmission instruction SNDGx in the memory SNDGQ. In practice (FIG. 9), the label associated with a transmission instruction SNDGx is formed in each stage of the memory SNDGQ by a first supplementary field Sndgtag, a second supplementary field (1 bit) Auxgmi, and a third supplementary field (also a 1 bit) Actgmi.

When a transmission instruction SNDGx is stored in the header stage of the memory SNDGQ (stage 60, FIG. 12), the seventh control unit MC2 transfers (stage 61, FIG. 12) the content of the main field CHx into the first supplementary field Sndgtag, the content of the first auxiliary field BAx into the second supplementary field Auxgmi, and the content of the second auxiliary field BBx into the third supplementary field Actgmi. The content of this label will remain unchanged during the propagation of the instruction SNDGx which it is attached, until this instruction reaches the header of the memory SNDGQ. At that instant, the eighth control unit MC3 will test for (stage 62) the presence or the absence of a modifying instruction GMIx which is earlier in time in the memory DIDQ.

If a modifying instruction GMIx is present, then the third control unit MC2 will wait for extracting the transmission instruction from the memory SNDGQ, and for the modifying instruction GMIx to be extracted from the memory DIDQ (stage 64). If, in contrast, no instruction GMIx is detected in the memory DIDQ, the seventh control unit MC2 will immediately extract the transmission instruction SNDGx from the header of the memory SNDGQ (stage 63). It is the eighth control unit MC3 which will derive the criteria for extraction of this transmission instruction SNDGx having reached the header of the first memory.

Figure 13:
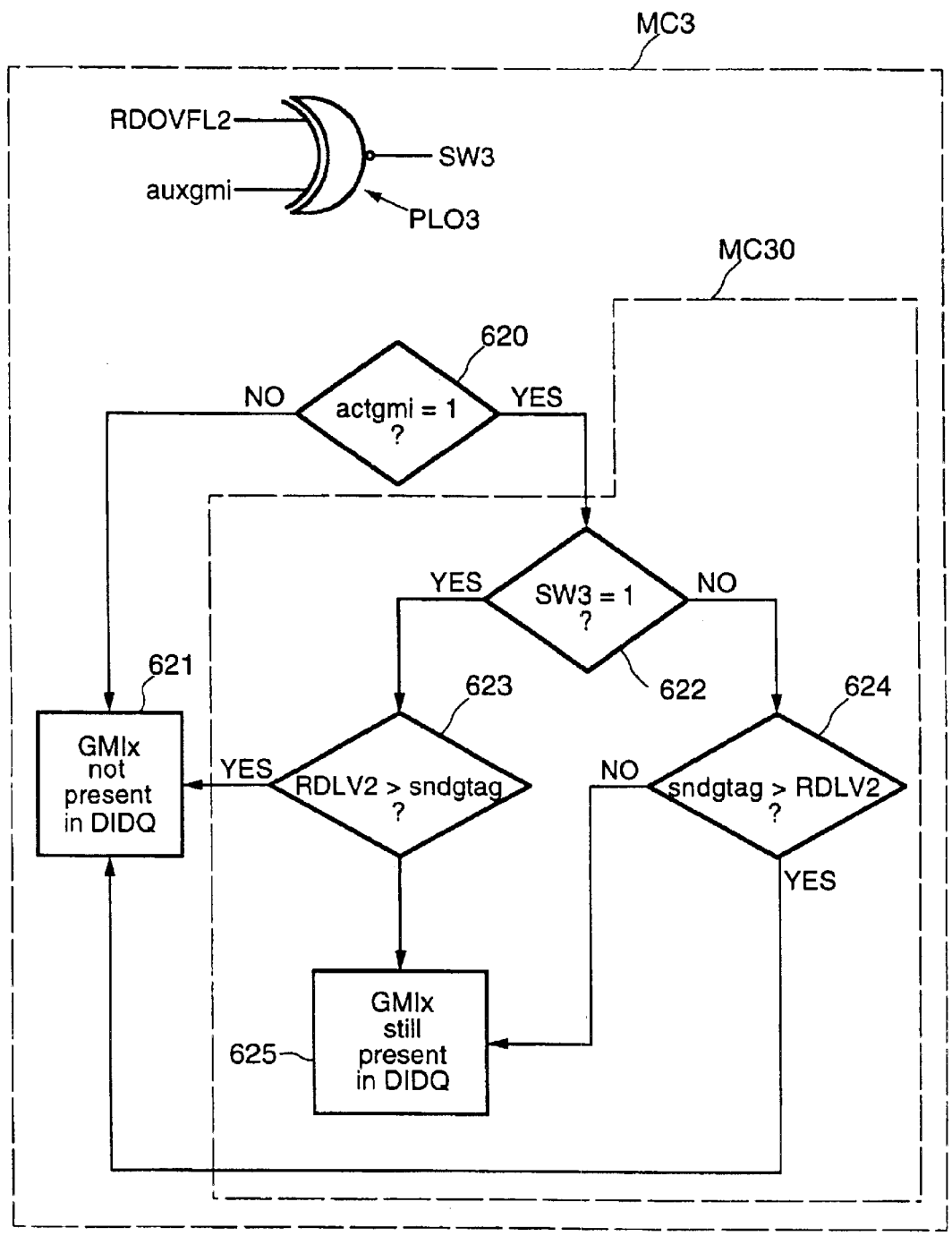

To determine whether a modifying instruction GMIx is present in the memory DIDQ, the unit MC3 will first of all test the value of the bit Actgmi of the label attached to the transmission instruction SNDGx (stage 620, FIG. 13). If this bit Actgmi is equal to 0, then that means that no instruction GMIx which is earlier in time than the instruction SNDGx is present in the memory DIDQ (stage 621). In this case, the transmission instruction SNDGx can be extracted immediately from the memory SNDGQ (stage 63, FIG. 12).

If, in contrast, the bit Actgmi is at 1, then it is basically appropriate to compare the content of the first supplementary field Sndgtag with the current value RDVL2 of the read counter. This is the role of the comparison means MC30. Basically, an absence of instruction GMIx will be conveyed by a value RDVL2 which is strictly higher than the first supplementary field Sndgtag. That being so, it is appropriate to take into account the effects of the circular counting windows.

It is for this reason that provision is made for the control unit MC3 to include second supplementary comparison means, here formed from a second exclusive NOR logic gate, referenced PLO3 and able to compare the bit Auxgmi with the overflow bit RDOVFL2 of the read counter. The result of this comparison supplies a second logic signal SW3. This signal SW3 indicates whether the read pointer PL2 of the second memory DIDQ is in the same circular window as the position of the last modifying instruction GMIx, potentially having an effect on the transmission instruction SNDGx.

If the signal SW3 is at 1, then the transmission instruction SNDGx will be able to be transmitted if the value RDVL is higher than Sndgtag (stage 623, FIG. 7). In the opposite case, that means that an instruction GMIx is still present in the second memory DIDQ (stage 625). It is appropriate to wait before extracting the transmission instruction SNDGx from the header of the memory SNDGQ. If the signal SW3 is at 0, then it is possible to extract the transmission instruction SNDGx if the value of the word Sndgtag is strictly higher than the value of the read counter RDVL (stage 624). In the opposite case, it is appropriate to wait (stage 625).

In hardware terms, the various control units MC0-MC3 can be produced in the form of an integrated circuit by using logic-synthesis tools. It should also be noted that the depth of the memory SNDGQ may be different from that of the memory DIDQ. Furthermore, everything which has just been described for a guard indication Gx may be carried out in parallel simultaneously for all the guard indications.

In FIG. 14, which again illustrates the four FIFO memories according to the invention, allowing overall management of instructions according to the invention, including the instructions for loading of memory stored data into a register, the guarded instructions, and in particular the guarded loading instructions, it is seen that the transmission instruction intended to have the value of the guard indication associated with the loading instruction which has been stored in the memory RLDQ transmitted, will be issued to the guard indication register GR. Then, the corresponding value of the guard indication will be stored in the fourth memory RCGQ.

Needless to say, as already indicated above, in the case of a guarded indication which has been issued to another processing unit, for example, the unit AU or the unit GU, the value of the guard indication associated with these guarded instructions will be delivered to the other unit AU or GU.

Figure 14:
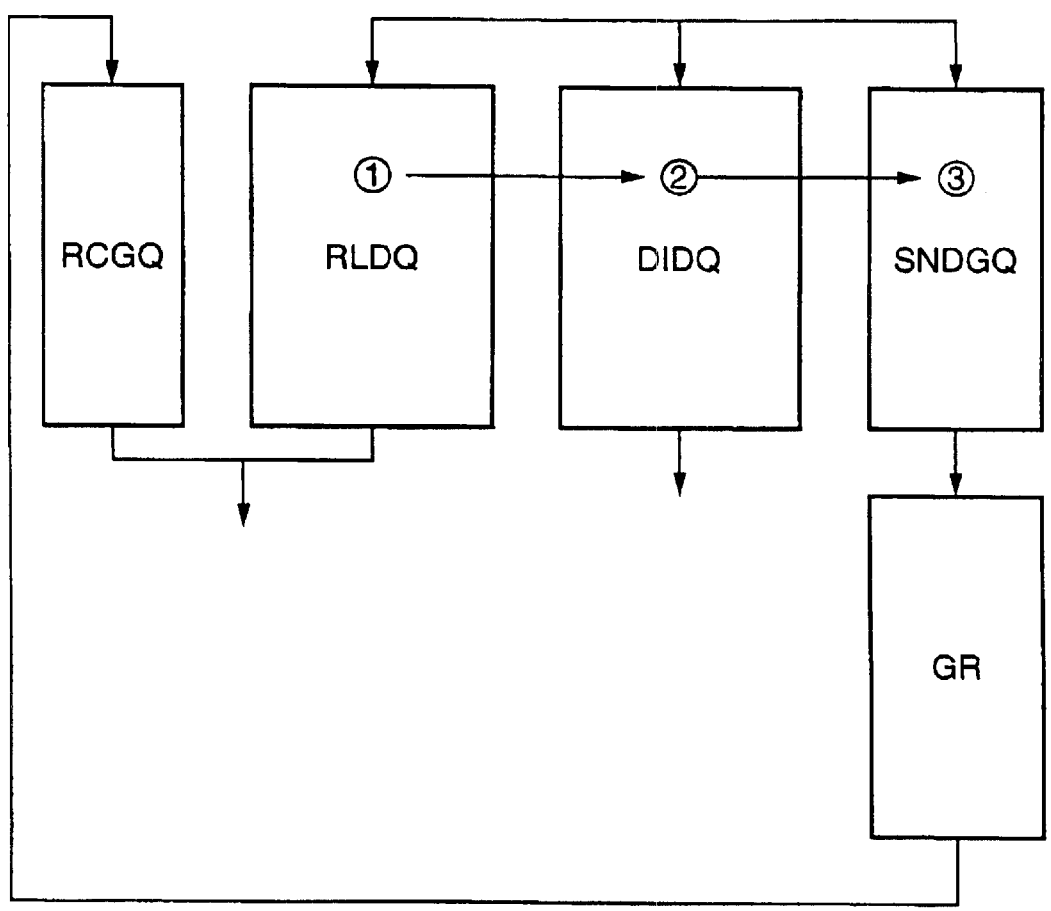
FIG. 14 illustrates, still diagrammatically and more specifically, the four FIFO memories present in the arithmetic and logic processing unit as well as their time-based interdependence in association with the guard indication register according to the invention.

Furthermore, in FIG. 14, the numerals 1, 2 and 3 situated in a circle reiterate the time-based dependencies of the three memories RLDQ, DIDQ and SNDGQ. In other words, in the presence of a load-modifying instruction which is earlier in time and intended to modify the value of at least one register associated with an operative instruction, the operative instruction is extracted from the second memory DIDQ only after the load-modifying instruction has been extracted from the first memory RLDQ.

Likewise, in the presence of a modifying instruction which is earlier in time and intended to modify the value of the guard indication associated with the transmission instruction, this transmission instruction is extracted from the third memory only after the modifying instruction has been extracted from the second memory. Furthermore, it is quite clear that certain loading instructions may not be guarded. In this case, they are stored in the memory RLDQ, and there are no corresponding transmission instructions stored in the memory SNDGQ. Furthermore, in this case, the content of the output stage of the fourth memory RCGQ is not read.

What is claimed is:

1. A method for handling instructions within a processor with a decoupled architecture, the processor comprising a first processing unit including at least one register, first and second FIFO-type memories for storing instructions for the second processing unit, the method comprising:
   providing to the third FIFO-type memory an operative instruction for deriving an address of memory stored data;
   providing to the first FIFO-type memory a loading instruction for loading the memory stored data into the at least one register, the loading instruction being executed only when the memory stored data has been delivered by the second processing unit, each loading instruction being provided to the first FIFO-type memory for storage therein and other operative instructions for the first processing unit being provided to the second FIFO-type memory for storage therein; and
   removing from the second FIFO-type memory the operative instruction involving the at least one register after having reached an output of the second FIFO-type memory if no earlier loading instruction for modifying a value of the at least one register associated with this operative instruction is present in the first FIFO-type memory, and in the presence of such an earlier loading instruction, then removing the operative instruction from the second FIFO-type memory only after the loading instruction has been removed from the first FIFO-type memory.

2. A method according to claim 1, wherein the first and second FIFO-type memories are separate from one another.

3. A method according to claim 1, further comprising:
   storing a non-operative instruction in the first FIFO-type memory every time an operative instruction is stored in the second FIFO-type memory without provision being made simultaneously to store a loading instruction in the first FIFO-type memory;
   incrementing a first read counter every time an instruction is removed from the first FIFO-type memory;
   incrementing a first write counter every time an instruction is stored in the first FIFO-type memory;
   storing a current value of the first write counter in a memory every time a loading instruction is stored in the first FIFO-type memory; and
   comparing the current value of the first write counter with a current value of the first read counter for determining characteristics of the loading instruction in the first FIFO-type memory.

4. A method according to claim 3, wherein a size of the first write and read counters are identical and equal to a size of the first FIFO-type memory; and further comprising:
   changing a value of an overflow bit every time a respective first counter returns to its initial value;
   storing a current value of the overflow bit of the first write counter in the memory every time a loading instruction is stored in the first FIFO-type memory; and
   wherein comparing the current value of the first write counter with a current value of the first read counter for determining characteristics of the loading instruction in the first FIFO-type memory further comprises comparing a current value of the overflow bit of the first read counter with the current value of the overflow bit of the first write counter.

5. A method according to claim 4, further comprising:
   associating a first label every time an operative instruction involving the at least one register is stored in the second FIFO-type memory, the first label containing the current value of the first write counter which was stored in the memory when a last loading instruction modifying the at least one register involved with the operative instruction was stored in the first FIFO-type memory; and
   criteria for removing the stored operative instruction having reached an output of the second FIFO-type memory being based upon a result of a comparison between a current value associated with the stored operative instruction and the current value of the first read counter.

6. A method according to claim 5, further comprising associating the current value of the overflow bit of the first write counter, which was stored in the memory when the last loading instruction modifying the at least one register involved with the operative instruction was stored in the first FIFO-type memory, with the operative instruction being stored in the second FIFO-type memory and its first label; and wherein the criteria for removing the stored operative instruction having reached the output of the second FIFO-type memory also takes into account a result of the comparison between the current value associated with the stored operative instruction and the current value of the overflow bit of the first read counter.

7. A method according to claim 1, wherein the processor further comprises fourth and fifth FIFO-type memories associated with the first processing unit, the fourth and fifth FIFO-type memories being separate from the first and second FIFO-type memories, and the first processing unit comprises a guard indication register; and further comprising:
   providing a guarded instruction to the third FIFO-type memory or providing a guarded loading instruction to the first processing unit causes a transmission instruction to be provided to the first processing unit and stored in the fourth FIFO-type memory for causing transmission to the second processing unit or to the fifth FIFO-type memory, respectively, a value of a guard indication associated with the guarded instruction or with the guarded loading instruction, respectively;
   if a modifying instruction earlier in time and intended to modify the value of the guard indication associated with the transmission instruction is not in the second FIFO-type memory, then removing the transmission instruction after having reached an output of the fourth FIFO-type memory; and
   if the modifying instruction earlier in time and intended to modify the value of the guard indication associated with the transmission instruction is in the second FIFO-type memory, then removing the transmission instruction from the fourth FIFO-type memory only after the modifying instruction has been removed from the second FIFO-type memory.

8. A method according to claim 7, further comprising:

incrementing a second read counter every time an instruction is removed from the second FIFO-type memory;

incrementing a second write counter every time an instruction is stored in the second FIFO-type memory;

storing a current value of the second write counter in the memory every time a modifying instruction for modifying a value of a guard indication is stored in the second FIFO-type memory; and comparing the stored current value of the second write counter with a current value of the second read counter for determining characteristics of the modifying instruction in the second FIFO-type memory.

9. A method according to claim 8, wherein a size of the second write and read counters are identical and are equal to a size of the second FIFO-type memory; and further comprising:

changing a current value of an overflow bit every time a respective second counter returns to its initial value;

storing the current value of the overflow bit of the second write counter in a memory every time a modifying instruction is stored in the second FIFO-type memory; and wherein comparing the stored current value of the second write counter with a current value of the second read counter for determining characteristics of the modifying instruction in the second FIFO-type memory further comprises comparing the current value of the overflow bit of the second read counter with the stored current value of the overflow bit of the second write counter.

10. A method according to claim 9, further comprising:

associating a label with the transmission instruction being stored in the fourth FIFO-type memory, the label containing the current value of the second write counter which was stored in the memory when the last instruction modifying the guard indication associated with the transmission instruction was stored in the second FIFO-type memory; and criteria for removing the transmission instruction after having reached an output of the fourth FIFO-type memory being based upon a result of the comparison between a current value of the stored transmission instruction and the current value of the second read counter.

11. A method according to claim 10, further comprising:

associating the current value of the overflow bit of the second write counter, which was stored in the memory when the last modifying instruction modifying the guard indication associated with the transmission instruction was stored in the second FIFO-type memory, with the transmission instruction being stored in the fourth FIFO-type memory and its label; and criteria for removing this transmission instruction after having reached an output of the fourth FIFO-type memory also being based upon a result of the comparison between the stored current value associated with the transmission instruction and the current value of the overflow bit of the second read counter.

12. A method for handling instructions within a processor comprising a core including a plurality of processing units, and a plurality of FIFO-type memories for sequentially storing respective instructions for the plurality of processing units, the method comprising:

issuing an instruction within the core for loading memory stored data into at least one register of a first processing unit causes the core to provide to a third FIFO-type memory, associated with a second processing unit, an operative instruction for deriving an address of the memory stored data, provide to a first FIFO-type memory, associated with the first processing unit, a loading instruction for loading the memory stored data into the at least one register, the loading instruction being executed when the memory stored data has been delivered by the second processing unit, each loading instruction being provided to the first FIFO-type memory for storage therein and other operative instructions for the first processing unit being provided to the second FIFO-type memory for storage therein, and removing from the second FIFO-type memory the operative instruction involving the at least one register after having reached an output of the second FIFO-type memory if no earlier loading instruction for modifying a value of the at least one register associated with this operative instruction is present in the first FIFO-type memory, and in the presence of such an earlier loading instruction, then removing the operative instruction from the second FIFO-type memory after the loading instruction has been removed from the first FIFO-type memory.

13. A method according to claim 12, wherein the first and second FIFO-type memories are separate from one another.

14. A method according to claim 12, further comprising:

storing a non-operative instruction in the first FIFO-type memory every time an operative instruction is stored in the second FIFO-type memory without provision being made simultaneously to store a loading instruction in the first FIFO-type memory;

incrementing a first read counter every time an instruction is removed from the first FIFO-type memory;

incrementing a first write counter every time an instruction is stored in the first FIFO-type memory;

storing a current value of the first write counter in a memory every time a loading instruction is stored in the first FIFO-type memory; and comparing the current value of the first write counter with a current value of the first read counter for determining characteristics of the loading instruction in the first FIFO-type memory.

15. A method according to claim 14, wherein a size of the first write and read counters are identical and equal to a size of the first FIFO-type memory; and further comprising:

changing a value of an overflow bit every time a respective first counter returns to its initial value;

storing a current value of the overflow bit of the first write counter in the memory every time a loading instruction is stored in the first FIFO-type memory; and wherein comparing the current value of the first write counter with a current value of the first read counter for determining characteristics of the loading instruction in the first FIFO-type memory further comprises comparing a current value of the overflow bit of the first read counter with the current value of the overflow bit of the first write counter.

16. A method according to claim 15, further comprising:
associating a first label every time an operative instruction involving the at least one register is stored in the second FIFO-type memory, the first label containing the current value of the first write counter which was stored in the memory when a last loading instruction modifying the at least one register involved with the operative instruction was stored in the first FIFO-type memory; and criteria for removing the stored operative instruction having reached an output of the second FIFO-type memory being based upon a result of a comparison between a current value associated with the stored operative instruction and the current value of the first read counter.

17. A method according to claim 16, further comprising associating the current value of the overflow bit of the first write counter, which was stored in the memory when the last loading instruction modifying the at least one register involved with the operative instruction was stored in the first FIFO-type memory, with the operative instruction being stored in the second FIFO-type memory and its first label; and wherein the criteria for removing the stored operative instruction having reached the output of the second FIFO-type memory also takes into account a result of the comparison between the current value associated with the stored operative instruction and the current value of the overflow bit of the first read counter.

18. A method according to claim 12, wherein the processor further comprises fourth and fifth FIFO-type memories associated with the first processing unit, the fourth and fifth FIFO-type memories being separate from the first and second FIFO-type memories, and the first processing unit comprises a guard indication register; and further comprising:

providing a guarded instruction to the third FIFO-type memory or providing a guarded loading instruction to the first processing unit causes a transmission instruction to be provided to the first processing unit and stored in the fourth FIFO-type memory for causing transmission to the second processing unit or to the fifth FIFO-type memory, respectively, a value of a guard indication associated with the guarded instruction or with the guarded loading instruction, respectively;

if a modifying instruction earlier in time and intended to modify the value of the guard indication associated with the transmission instruction is not in the second FIFO-type memory, then removing the transmission instruction after having reached an output of the fourth FIFO-type memory; and if the modifying instruction earlier in time and intended to modify the value of the guard indication associated with the transmission instruction is in the second FIFO-type memory, then removing the transmission instruction from the fourth FIFO-type memory only after the modifying instruction has been removed from the second FIFO-type memory.

19. A method according to claim 18, further comprising:
incrementing a second read counter every time an instruction is removed from the second FIFO-type memory;
incrementing a second write counter every time an instruction is stored in the second FIFO-type memory;
storing a current value of the second write counter in the memory every time a modifying instruction for modifying a value of a guard indication is stored in the second FIFO-type memory; and comparing the stored current value of the second write counter with a current value of the second read counter for determining characteristics of the modifying instruction in the second FIFO-type memory.

20. A method according to claim 19, wherein a size of the second write and read counters are identical and are equal to a size of the second FIFO-type memory; and further comprising:

changing a current value of an overflow bit every time a respective second counter returns to its initial value;
storing the current value of the overflow bit of the second write counter in a memory every time a modifying instruction is stored in the second FIFO-type memory; and
wherein comparing the stored current value of the second write counter with a current value of the second read counter for determining characteristics of the modifying instruction in the second FIFO-type memory further comprises comparing the current value of the overflow bit of the second read counter with the stored current value of the overflow bit of the second write counter.

21. A method according to claim 20, further comprising:
associating a label with the transmission instruction being stored in the fourth FIFO-type memory, the label containing the current value of the second write counter which was stored in the memory when the last instruction modifying the guard indication associated with the transmission instruction was stored in the second FIFO-type memory; and criteria for removing the transmission instruction after having reached an output of the fourth FIFO-type memory being based upon a result of the comparison between a current value of the stored transmission instruction and the current value of the second read counter.

22. A method according to claim 21, further comprising:
associating the current value of the overflow bit of the second write counter, which was stored in the memory when the last modifying instruction modifying the guard indication associated with the transmission instruction was stored in the second FIFO-type memory, with the transmission instruction being stored in the fourth FIFO-type memory and its label; and criteria for removing this transmission instruction after having reached an output of the fourth FIFO-type memory also being based upon a result of the comparison between the stored current value associated with the transmission instruction and the current value of the overflow bit of the second read counter.

23. A processor comprising:
a first processing unit comprising at least one register;
first and second FIFO-type memories for storing instructions for said first processing unit;
a second processing unit;
a third FIFO-type memory for storing instructions for said second processing unit;
a central unit, in response to an instruction for loading memory stored data into said at least one register, providing to said third FIFO-type memory an operative instruction for deriving an address of the memory stored data, providing to said first FIFO-type memory a loading instruction for loading the memory stored data into said at least one register, the loading instruction being executed when the memory stored data has been delivered by said second processing unit, and providing each loading instruction to said first FIFO-type memory for storage therein and for providing other operative instructions for said first processing unit to said second FIFO-type memory for storage therein; and a first controller for removing from said second FIFO-type memory an operative instruction involving said at least one register after having reached an output of said second FIFO-type memory if no earlier loading instruction for modifying a value of said at least one register associated with this operative instruction is present in said first FIFO-type memory, and in the presence of such an earlier loading instruction, then removing the operative instruction from said second FIFO-type memory after the loading instruction has been removed from said first FIFO-type memory.

24. A processor according to claim 23, wherein said first and second FIFO-type memories are separate from one another.

25. A processor according to claim 23, wherein said first controller comprises:

a first read counter incremented every time an instruction is removed from said first FIFO-type memory;

a first write counter incremented every time an instruction is stored in said first FIFO-type memory;

at least one first individual register associated with said at least one register;

a first control unit for storing a current value of said first write counter in a main field of said at least one first individual register associated said at least one register whenever a loading instruction for loading into said at least one register is stored in said first FIFO-type memory; and a second control unit comprising a first comparison circuit for determining characteristics of the loading instruction in said first FIFO-type memory by comparing a content of the main field of said at least one first individual register with a current value of said first read counter.

26. A processor according to claim 25, wherein a size of said first write and read counters are identical and are equal to a size of the first FIFO-type memory; wherein a value of an overflow bit changes value every time an associated first counter returns to its initial value; wherein each first individual register includes an auxiliary field; said first control unit stores a current value of the overflow bit of said first write counter in the auxiliary field of said at least one first individual register every time a loading instruction is loaded into said first FIFO-type memory; and said second control unit comprises a first auxiliary comparison circuit for comparing a current value of the overflow bit of said first read counter with a content of the auxiliary field.

27. A processor according to claim 26, wherein said first auxiliary comparison circuit comprises an exclusive NOR logic gate.

28. A processor according to claim 26, wherein said second FIFO-type memory comprises a plurality of stages including an input stage and an output stage, and a useable field for storing at least one operative instruction involving said at least one register, and a second supplementary field; and wherein said at least one register comprises a plurality of registers, and said at least one first individual register comprises a plurality of first individual registers; and further comprising:

a third control unit able, every time an operative instruction involving at least one of said plurality of registers is stored in the usable field of the input stage of said second FIFO-type memory, to select from among all said plurality of first individual registers associated with all of said plurality of registers involved in the operative instruction, the one corresponding to a last loading instruction for modifying at least one of said plurality of registers involved, and for transferring a content of the main field of a selected first individual register, into the first supplementary field of the input stage of said second FIFO-type memory; and a fourth control unit comprising a first comparison circuit for deriving criteria for removing the operative instruction after having reached the output stage of said second FIFO-type memory by comparing a content of the first supplementary field of the output stage with the current value of said first read counter.

29. A processor according to claim 28, wherein each stage of said second FIFO-type memory further includes a second supplementary field; said third control unit being able, every time an operative instruction is stored in the usable field of the input stage of the second FIFO-type memory, for transferring a content of the auxiliary field of a selected first individual register, into the second supplementary field of the input stage of said second FIFO-type memory; and said fourth control unit comprises a first supplementary comparison circuit for comparing a content of the second supplementary field with the current value of the overflow bit of said first read counter.

30. A processor according to claim 29, wherein said first supplementary comparison circuit comprises an exclusive NOR logic gate.

31. A processor according to claim 23, further comprising fourth and fifth FIFO-type memories associated with said first processing unit, said fourth and fifth FIFO-type memories being separate from said first and second FIFO-type memories; wherein said first processing unit comprises a guard indication register; said central unit providing a guarded instruction to said third FIFO-type memory or providing a guarded loading instruction to said first processing unit causes a transmission instruction to be provided to said first processing unit and stored in said fourth FIFO-type memory for causing transmission to said second processing unit or to said fifth FIFO-type memory, respectively, a value of a guard indication associated with the guarded instruction or with the guarded loading instruction, respectively; and further comprising a second controller for removing the transmission instruction from said fourth FIFO-type memory after the modifying instruction has been removed from said second FIFO-type memory if the modifying instruction earlier in time and intended to modify the value of the guard indication associated with the transmission instruction is not in said second FIFO-type memory, and if the modifying instruction earlier in time and intended to modify the value of the guard indication associated with the transmission instruction is in said second FIFO-type memory, then removing the transmission instruction from said fourth FIFO-type memory after the modifying instruction has been removed from the second FIFO-type memory.

32. A processor according to claim 31, wherein said second controller comprises:

a second read counter incremented every time an instruction is removed from said second FIFO-type memory;

a second write counter incremented every time an instruction is stored in said second FIFO-type memory;

a plurality of second individual registers associated respectively with a plurality of guard indications;

a fifth control unit able, every time a modifying instruction for modifying a value of a guard indication is stored in said second FIFO-type memory, to store the current value of the second write counter in a main field of one of said plurality of second individual registers associated with the guard indication; and a sixth control unit comprising a second comparison circuit for determining characteristics of the modifying instruction in said second FIFO-type memory by comparing a content of the main field of one of said plurality of second individual registers a current value of said second read counter.

33. A processor according to claim 32, wherein a size of said second write and read counters are identical and equal to a size of said second FIFO-type memory; and an overflow bit that changes value every time a corresponding second counter returns to its initial value is associated with each second counter; each second individual register further includes an auxiliary field; said fifth control unit is able, every time a modifying instruction modifying a value of a guard indication is stored in said second FIFO-type memory, to store the current value of the overflow bit of said second write counter in the auxiliary field of said corresponding second individual register; and said sixth control unit comprises a second auxiliary comparison circuit for comparing a current value of the overflow bit of said second read counter with a content of the auxiliary field.

34. A processor according to claim 33, wherein said second auxiliary comparison circuit comprises an exclusive NOR logic gate.

35. A processor according to claim 33, wherein each stage of said fourth FIFO-type memory includes a usable field for storing a transmission instruction, and a first supplementary field; said second controller comprising:

a seventh control unit able, every time a transmission instruction is stored in the usable field of the input stage of said third FIFO-type memory, to transfer a content of the main field of said plurality of second individual registers associated with the corresponding guard indication into the first supplementary field of the input stage of said fourth FIFO-type memory; and an eighth control unit for determining criteria for removing the transmission instruction having reached an output stage of said fourth FIFO-type memory, and comprising a second comparison circuit for comparing a content of the first supplementary field of the output stage with the current value of said second read counter.

36. A processor according to claim 35, wherein each stage of said fourth FIFO-type memory further includes a second supplementary field; said seventh control unit is able, every time a transmission instruction is stored in the usable field of the input stage of said fourth FIFO-type memory, to transfer a content of the auxiliary field of said second individual register associated with the corresponding guard indication into the second supplementary field of the input stage of said third FIFO-type memory; said eighth control unit comprises a second supplementary comparison circuit for comparing a content of the second supplementary field with the current value of the overflow bit of said second read counter.

37. A processor according to claim 36, wherein said second supplementary comparison circuit comprises an exclusive NOR logic gate.

* * * * *

UNITED STATES PATENT AND TRADEMARK OFFICE
CERTIFICATE OF CORRECTION

PATENT NO. : 6,854,049 B2
DATED : February 8, 2005
INVENTOR(S) : Andrew Cofler

It is certified that error appears in the above-identified patent and that said Letters Patent is hereby corrected as shown below:

Column 11,
Line 41, delete "Rx + LDQ" insert -- Rx = LDQ --

Signed and Sealed this

Nineteenth Day of July, 2005

JON W. DUDAS
*Director of the United States Patent and Trademark Office*